(12) United States Patent
Purohit et al.

(10) Patent No.: US 9,318,932 B2
(45) Date of Patent: Apr. 19, 2016

(54) CONTROL UNIT FOR A POWER TOOL

(75) Inventors: Madhur M. Purohit, Towson, MD (US); Earl M. Ortt, Towson, MD (US); Erik Ekstrom, York, PA (US); Shailesh P. Waikar, Parkville, MD (US); Marcell E. Coates, Baltimore, MD (US); Eric E. Hatfield, Anthem, AZ (US)

(73) Assignee: Black & Decker Inc., New Britain, CT (US)

( * ) Notice: Subject to any disclaimer, the term of this patent is extended or adjusted under 35 U.S.C. 154(b) by 450 days.

(21) Appl. No.: 13/712,200

(22) PCT Filed: Jun. 14, 2011

(86) PCT No.: PCT/IB2011/002427
§ 371 (c)(1),
(2), (4) Date: Jun. 27, 2013

(87) PCT Pub. No.: WO2011/161552
PCT Pub. Date: Dec. 29, 2011

(65) Prior Publication Data
US 2014/0132093 A1    May 15, 2014

Related U.S. Application Data

(60) Provisional application No. 61/354,537, filed on Jun. 14, 2010, provisional application No. 61/354,543, filed on Jun. 14, 2010.

(51) Int. Cl.
*H02K 7/14* (2006.01)
*H02K 9/06* (2006.01)
(Continued)

(52) U.S. Cl.
CPC .. *H02K 9/06* (2013.01); *H02K 3/28* (2013.01); *H02K 3/522* (2013.01); *H02K 5/225* (2013.01);
(Continued)

(58) Field of Classification Search
CPC ... H02K 7/145; H02K 5/225; H02K 11/0084; H02K 2203/03
USPC ....... 310/50, 64, 71, 43, 89, 68 R; 173/2, 217
See application file for complete search history.

(56) References Cited

U.S. PATENT DOCUMENTS 3,531,702 A    9/1970    Hill
3,678,358 A    7/1972    Kolatorowicz
(Continued)

FOREIGN PATENT DOCUMENTS

DE         2929259 B1    1/1981
DE    102004003711 A1    8/2005
(Continued)

OTHER PUBLICATIONS

Document Received from Third Party on Sep. 30, 2014.

*Primary Examiner* — Thanh Lam
(74) *Attorney, Agent, or Firm* — Amir R. Rohani; Scott B. Markow

(57) ABSTRACT

A power tool includes a brushless DC motor housed inside an upper body of the tool housing and a control unit housed inside a handle of the housing, the control unit including a micro-controller mounted on a control circuit board, a power unit electronically coupled to the micro-controller and mounted on a power circuit board arranged substantially parallel the control circuit board inside the handle, and a heat sink in thermal contact with the power unit. An input unit may be mounted directly on the control circuit board. An upper portion of the heat sink extending towards the upper body of the housing may include a tab protruding underneath a fan assembly of the motor to transfer heat from the power unit to the airflow created by the fan.

15 Claims, 22 Drawing Sheets

(51) Int. Cl.
  H02K 3/28 (2006.01)
  H02K 3/52 (2006.01)
  H02K 5/22 (2006.01)
  H02K 21/12 (2006.01)
  H02K 1/27 (2006.01)
  H02K 7/116 (2006.01)
  H02K 11/00 (2006.01)

(52) U.S. Cl.
  CPC ............ H02K 7/145 (2013.01); H02K 11/0021 (2013.01); H02K 11/0073 (2013.01); H02K 21/12 (2013.01); H02K 1/276 (2013.01); H02K 7/116 (2013.01); H02K 11/001 (2013.01); H02K 2203/03 (2013.01); H02K 2203/09 (2013.01)

(56) References Cited

U.S. PATENT DOCUMENTS

| | | | |
|---|---|---|---|
| 3,783,359 A | 1/1974 | Malkiel | |
| 4,619,624 A | 10/1986 | Kerr et al. | |
| 4,777,393 A | 10/1988 | Peot | |
| 5,113,951 A | 5/1992 | Houben et al. | |
| 5,115,175 A | 5/1992 | Fletcher | |
| 5,148,349 A | 9/1992 | Kogure et al. | |
| 5,753,173 A | 5/1998 | Leonard et al. | |
| 6,013,991 A | 1/2000 | Philipp | |
| RE36,820 E | 8/2000 | McGinley et al. | |
| 6,218,633 B1 | 4/2001 | Okumura et al. | |
| 6,259,047 B1 | 7/2001 | Kimata et al. | |
| 6,431,879 B2 | 8/2002 | Brekosky et al. | |
| 6,434,013 B2 | 8/2002 | Kitamura et al. | |
| 6,443,675 B1 | 9/2002 | Kopras et al. | |
| 6,538,403 B2 | 3/2003 | Gorti et al. | |
| 6,552,904 B2 | 4/2003 | Fung | |
| 6,555,773 B1 | 4/2003 | Broghammer et al. | |
| 6,577,030 B2 | 6/2003 | Tominaga et al. | |
| 6,598,684 B2 | 7/2003 | Watanabe | |
| 6,765,317 B2 | 7/2004 | Chu | |
| 6,791,219 B1 | 9/2004 | Eric et al. | |
| 6,799,282 B2 | 9/2004 | Maeda et al. | |
| 6,895,750 B2 | 5/2005 | Ando et al. | |
| 6,920,047 B2 | 7/2005 | Privett et al. | |
| 7,046,518 B2 | 5/2006 | Golightly et al. | |
| 7,064,462 B2 | 6/2006 | Hempe et al. | |
| 7,208,943 B2 | 4/2007 | Godoy et al. | |
| 7,259,531 B1 | 8/2007 | Liu | |
| 7,312,545 B2 | 12/2007 | Sasaki et al. | |
| 7,359,628 B2 | 4/2008 | Broghammer et al. | |
| 7,371,150 B2 | 5/2008 | Deshpande et al. | |
| 7,411,144 B2 | 8/2008 | Broghammer | |
| 7,547,123 B2 | 6/2009 | Kittredge et al. | |
| 7,564,208 B2 | 7/2009 | Bailey et al. | |
| 7,566,836 B2 | 7/2009 | Tanner | |
| 7,638,958 B2 | 12/2009 | Philipp et al. | |
| 7,643,296 B2 | 1/2010 | Yamada et al. | |
| 7,665,392 B2 | 2/2010 | Tokunaga et al. | |
| 7,733,054 B2 | 6/2010 | Phillips et al. | |
| 2006/0052914 A1 | 3/2006 | Kubokawa et al. | |
| 2006/0181857 A1 | 8/2006 | Belady et al. | |
| 2006/0222930 A1 * | 10/2006 | Aradachi et al. | 429/96 |
| 2007/0079980 A1 * | 4/2007 | Kononenko et al. | 173/90 |
| 2007/0128505 A9 * | 6/2007 | Yahnker et al. | 429/62 |
| 2007/0228824 A1 | 10/2007 | Yasukawa et al. | |
| 2007/0267990 A1 | 11/2007 | Abolhassani et al. | |
| 2008/0041620 A1 | 2/2008 | Albanese et al. | |
| 2008/0170841 A1 | 7/2008 | Schneider et al. | |
| 2008/0179078 A1 | 7/2008 | Opsitos | |
| 2008/0265695 A1 * | 10/2008 | Yoshida et al. | 310/50 |
| 2008/0265844 A1 | 10/2008 | Smith et al. | |
| 2009/0057006 A1 | 3/2009 | Kishibata et al. | |
| 2009/0107691 A1 | 4/2009 | Umeda et al. | |
| 2009/0145621 A1 | 6/2009 | Lau et al. | |
| 2009/0160468 A1 | 6/2009 | Lindsey et al. | |
| 2009/0200961 A1 | 8/2009 | Straub | |
| 2009/0272599 A1 | 11/2009 | Sekine et al. | |
| 2009/0277682 A1 | 11/2009 | Bungo | |
| 2009/0322149 A1 | 12/2009 | Kishibata | |
| 2010/0001675 A1 | 1/2010 | Matsunaga et al. | |
| 2010/0065295 A1 | 3/2010 | Aradachi et al. | |
| 2010/0071920 A1 | 3/2010 | Lau et al. | |
| 2010/0108341 A1 | 5/2010 | Casalena et al. | |
| 2010/0163266 A1 | 7/2010 | Matsunaga et al. | |
| 2010/0175972 A1 | 7/2010 | Kimata et al. | |

FOREIGN PATENT DOCUMENTS

| | | |
|---|---|---|
| DE | 102007011658 A1 | 9/2008 |
| DE | 102008036393 A1 | 2/2009 |
| DE | 102008041725 A1 | 3/2010 |
| DE | 102008042799 A1 | 4/2010 |
| EP | 0526821 A1 | 10/1993 |
| EP | 1374653 B1 | 1/2004 |
| EP | 1715565 A1 | 10/2006 |
| EP | 1683169 B1 | 4/2007 |
| EP | 1873800 A1 | 1/2008 |
| EP | 2050112 B1 | 4/2009 |
| EP | 2100702 A1 | 9/2009 |
| EP | 2103396 A1 | 9/2009 |
| GB | 2314980 A | 1/1998 |
| JP | 06254778 A | 9/1994 |
| JP | 06254779 A | 9/1994 |
| JP | 11277462 A | 10/1999 |
| JP | 2009240022 A | 10/2009 |
| WO | 2008083667 A1 | 7/2008 |
| WO | 2008083667 A2 | 7/2008 |
| WO | 2009145205 A1 | 12/2009 |

* cited by examiner

CONTROL UNIT FOR A POWER TOOL

CROSS-REFERENCE TO RELATED APPLICATIONS

This application claims the benefit of prior filed U.S. Provisional Application No. 61/354,537, filed Jun. 14, 2010. This application also claims the benefit of prior filed U.S. Provisional Application No. 61/354,543, filed Jun. 14, 2010. Contents of both applications are incorporated herein by reference in their entireties.

FIELD OF THE INVENTION

This disclosure relates to a power tool, and more particularly to an electric brushless DC motor for a power tool and the control therefore.

BACKGROUND

The use of cordless power tools has increased dramatically in recent years. Cordless power tools provide the ease of a power assisted tool with the convenience of cordless operation. Conventionally, cordless tools have been driven by Permanent Magnet (PM) brushed motors that receive DC power from a battery assembly or converted AC power. The motor associated with a cordless tool has a direct impact on many of the operating characteristics of the tool, such as output torque, time duration of operation between charges and durability of the tool. The torque output relates to the capability of the power tool to operate under greater loads without stalling. The time duration of the power tool operation is strongly affected by the energy efficiency of the motor. Since, during some operating modes cordless tools are powered by battery modules that contain a limited amount of energy, the greater the energy efficiency of the motor, the longer the time duration that the tool can be operated. The durability of a power tool is affected by many factors, including the type of motor that is used to convert electrical power into mechanical power.

Brushed motors such as the PM brushed motors that are generally employed in power tool applications are susceptible to damaged brushes over time. The main mechanical characteristic that separates Permanent Magnet brushless motors from Permanent Magnet brushed motors is the method of commutation. In a PM brushed motor, commutation is achieved mechanically via a commutator and a brush system. Whereas, in a brushless DC motor, commutation is achieved electronically by controlling the flow of current to the stator windings. A brushless DC motor includes a rotor for providing rotational energy and a stator for supplying a magnetic field that drives the rotor. Comprising the rotor is a shaft supported by a bearing set on each end and encircled by a permanent magnet (PM) that generates a magnetic field. The stator core mounts around the rotor maintaining an air-gap at all points except for the bearing set interface. Included in the air-gap are sets of stator windings that are typically connected in either a three-phase wye or Delta configuration. Each of the windings is oriented such that it lies parallel to the rotor shaft. Power devices such as MOSFETs are connected in series with each winding to enable power to be selectively applied. When power is applied to a winding, the resulting current in the winding generates a magnetic field that couples to the rotor. The magnetic field associated with the PM in the rotor assembly attempts to align itself with the stator generated magnetic field resulting in rotational movement of the rotor. A control circuit sequentially activates the individual stator coils so that the PM attached to the rotor continuously chases the advancing magnetic field generated by the stator windings. A set of sense magnets coupled to the PMs in the rotor assembly are sensed by a sensor, such as a Hall Effect sensor, to identify the current position of the rotor assembly. Proper timing of the commutation sequence is maintained by monitoring sensors mounted on the rotor shaft or detecting magnetic field peaks or nulls associated with the PM.

A brushless motor provides many advantages over conventional brushed motors. Conventional brushed motors are substantially less durable than brushless motors because of the wear and tear associated with the brushes. Also, since commutation is handled via a microcontroller, mechanical failures associated with the commutation are minimized and fail conditions are better managed and handled. Furthermore, brushed motors are less efficient than brushless motors due to the friction and the heat associated with the brushes and the commutator. However, brushless motors are generally more expensive than conventional brushed motors. The most significant factors driving the cost of a brushless DC motor are the power density, the cost of the permanent magnets and electronic components, and complex production procedures. Challenges with the assembly process include, for example, alignment of the various components of the motor, particularly the alignment of the PMs to the sense magnets and the Hall Effect sensor. Also, the heat generated by the power MOSFETs presents challenges to the operation of the motor. There are also challenges in connecting the field windings as well as the overall size and design of the brushless motor. Additionally, as hand-held power tools become increasingly smaller from an ergonomic standpoint, it is desirable to reduce the size of the motor and the control components inside the power tool.

SUMMARY

According to an embodiment of the invention, a power tool is provided. The power tool may be, for example, a drill or an impact driver, although other types of power tools may also be used. The power tool includes a housing and a brushless DC motor housed inside an upper body of the housing.

According to an aspect of the invention, a control unit is provided for controlling the function of the motor and is housed inside a handle of the housing. The control unit includes a micro-controller mounted on a control circuit board, a power unit electronically coupled to the micro-controller and mounted on a power circuit board arranged substantially parallel the control circuit board inside the handle, and a heat sink in thermal contact with the power unit. The power unit may include two or more through-holes for directly mounting the heat sink over the power unit.

According to an embodiment, the power tool includes an input unit, such as a forward/reverse, variable-speed trigger switch, a portion of which is integrally mounted on the control circuit board. The input unit may, for example, include a main body that is mounted on the control circuit board and is attached to the forward/reverse switch and the variable-speed switch. The main body may include the circuitry of the input unit, such as a potentiometer coupled to the variable-speed switch. In an embodiment, an outer wall of the main body includes one or more snaps for securing a connection of the input unit over the control circuit board and a series of pins for providing signals associated with on/off, variable-speed, and forward/reverse functionalities to the micro-controller.

In an embodiment, the length of the control circuit board is greater than the power circuit board to accommodate the mounting of the input unit on the control circuit board adjacent the power circuit board. Also, a bulk capacitor may be mounted on the other side of the control circuit board adjacent the power circuit board.

According to an embodiment, the control unit includes a potting boat containing the control circuit board and the power circuit board. The potting boat may include a cut-out portion to facilitate mounting the input unit on the control circuit board. The cut-out portion of the potting board may include a groove that forms a labyrinth with a tongue of the input unit.

According to another aspect of the invention, the power tool includes a control unit comprising a micro-controller mounted over a control circuit board and an input unit having a main body attached to a forward/reverse switch and a variable-speed switch, the main body being mounted directly on a portion of the control circuit board. The main body may include a potentiometer coupled to the variable-speed switch. An outer wall of the main body may include one or more snaps for securing a connection of the input unit over the control circuit board and a series of pins for providing signals associated with on/off, variable-speed, and forward/reverse functionalities to the micro-controller. The control unit may also include a potting boat containing the control circuit board and the power circuit board. The potting boat may include a cut-out portion to facilitate mounting the input unit on the control circuit board. The cut-out portion of the potting board may include a groove that forms a labyrinth with a tongue of the input unit.

According to another aspect of the invention, the brushless DC motor includes a stator assembly and a rotor assembly partially arranged pivotably inside the stator assembly, the rotor assembly including a rotor lamination stack, a rotor fixedly housed inside a center portion of the lamination stack to pivot therewith, and a motor fan fixedly attached to the rotor and arranged adjacent the stator assembly. The control unit includes a micro-controller, a power unit coupled to the micro-controller, and a heat sink in thermal contact with the power unit. An upper portion of heatsink that extends towards the upper body of the housing includes a tab protruding underneath the motor fan to transfer heat from the power unit to the airflow created by the motor fan. The tab may include a series of grooves underneath the fan to increase the surface contact of the tab with the motor fan airflow. The heat sink may also include a second tab protruding near a gap between the housing one or more switches associated with the input unit. In embodiments where the input unit is mounted on a control circuit board of the control unit, the heat sink may further include a protruded surface to bypass the input unit.

For a more complete understanding of the invention, its objects and advantages, reference may be had to the following specification and to the accompanying drawings.

BRIEF DESCRIPTION OF THE DRAWINGS

The drawings described herein are for illustration purposes only and are not intended to limit the scope of this disclosure in any way.

DESCRIPTION

Figure 1:
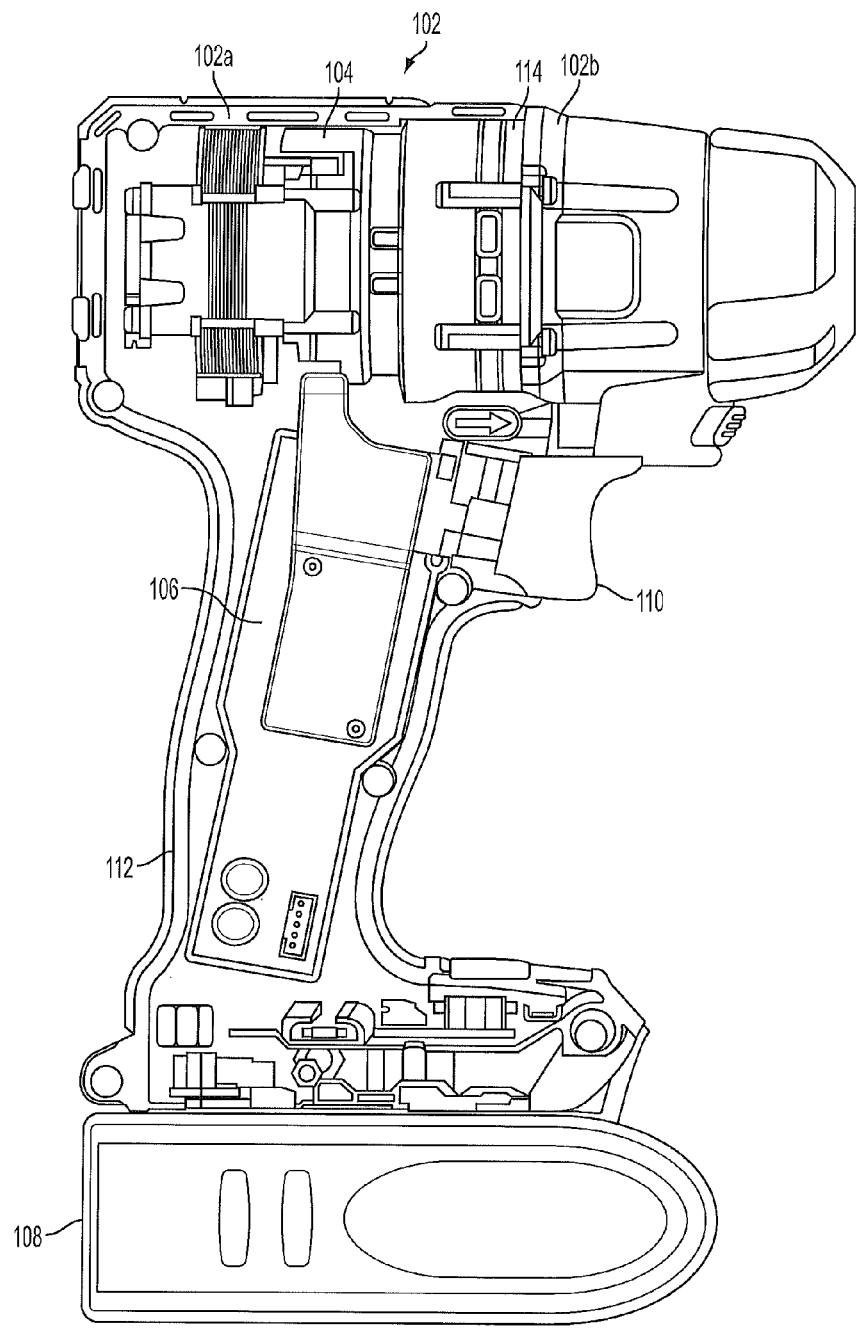
FIG. 1 depicts a perspective cross-sectional view of a power tool, according to an embodiment of this disclosure.

With reference to the FIG. 1, a power tool 100 constructed in accordance with the teachings of the present disclosure is illustrated in a longitudinal cross-section view. The power tool 100 in the particular example provided may be a drill/driver, but it will be appreciated that the teachings of this disclosure is merely exemplary and the power tool of this invention could be a circular saw, a reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a housing assembly 102, a motor assembly 104, a control module 104, a battery pack 108, an input unit (e.g., a variable speed trigger) 110, a transmission assembly 114, an output spindle (not shown), and a chuck (not shown) that can be coupled for rotation with the output spindle. The housing assembly 102 can include a housing 102a and a gear case 102b that can be removably coupled to the housing 102a. The housing 102a can define a housing body and a handle 112.

According to an embodiment, the motor 104 is received in the housing 102a. The motor can be any type of motor and may be powered by an appropriate power source (electricity, pneumatic power, hydraulic power). In the particular example provided, the motor is a brushless DC electric motor and is powered by a battery pack 108. An input unit 110 is mounted in the handle 112 below the housing 102a. The input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit and provide respective inputs of these functions to the control unit 106. The control unit 106, which is coupled to the input unit 110 as described further below, supplies the drive signals to the motor. In the exemplary embodiment of the invention, the control unit 106 is provided in the handle 112.

The brushless motor 104 depicted in FIG. 1 is commutated electronically by the control unit 106. The tool 100 is powered by a suitable power source such as the battery pack 108. It is envisioned, however, that the present disclosures can be applied to a power tool with an AC power source, which may further include an AC-to-DC converter to power to motor. Using the variable-speed input and other inputs from the input unit 110, the control unit 106 controls the amount of power supplied to the motor 104. In an exemplary embodiment, the control unit 106 controls the Pulse Width Modulation (PWM) duty cycle of the DC power supplied to the motor 104.

Figure 2A:
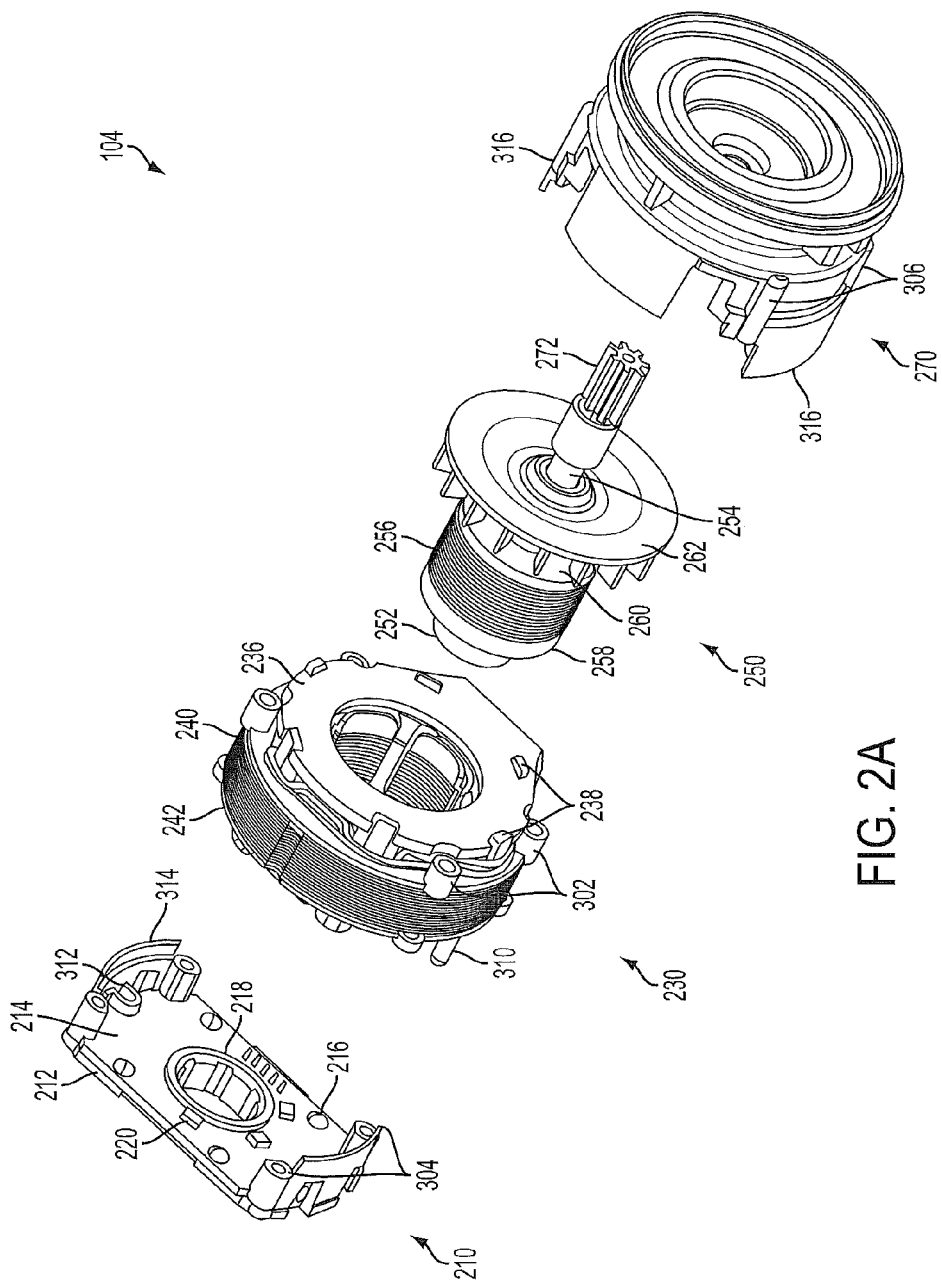
FIGS. 2A and 2B depict perspectives expanded views of a brushless electric motor, according to an embodiment of this disclosure.
Figure 2B:
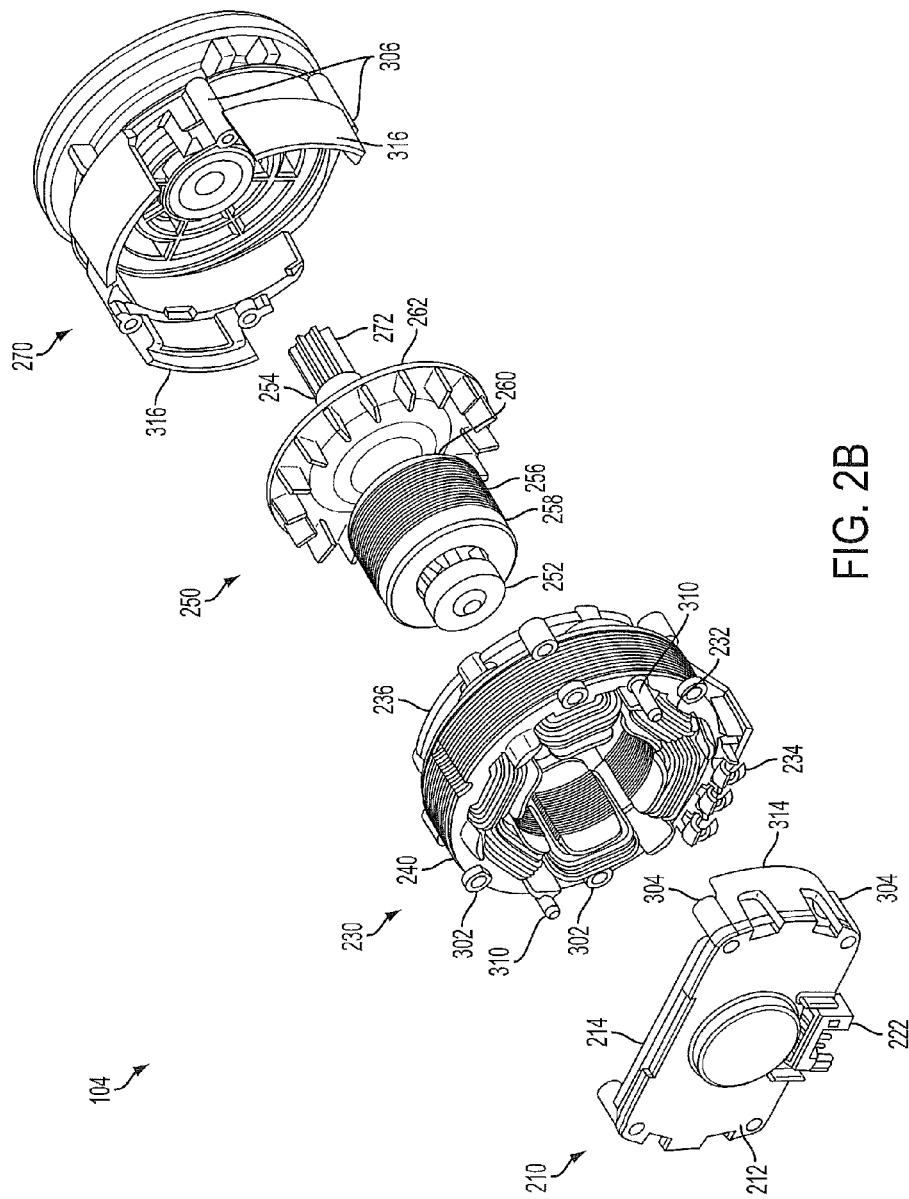
Figure 2C:
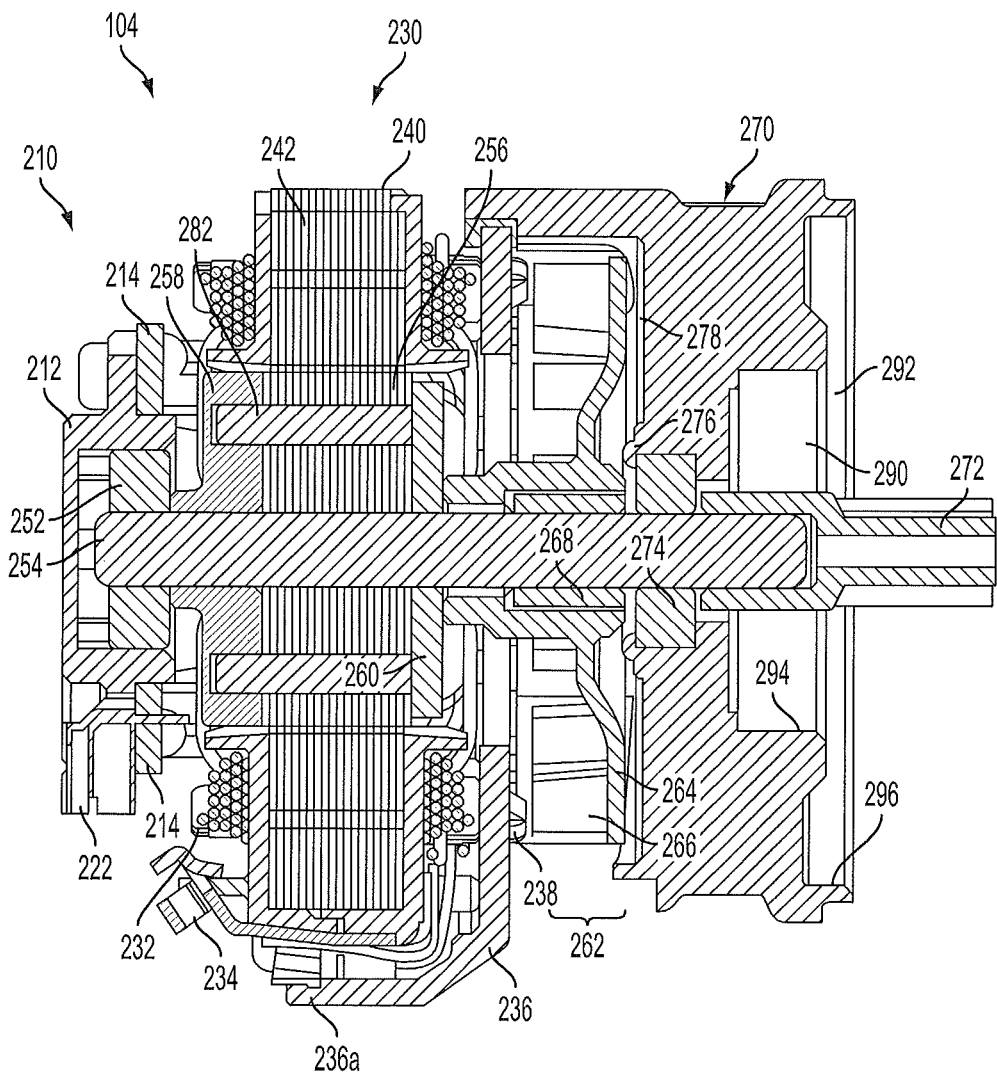
FIG. 2C depicts a perspective cross-sectional view of the brushless electric motor of FIGS. 2A and 2B, according to an embodiment of this disclosure.

Referring now to FIGS. 2A and 2B, perspectives expanded views of the brushless electric motor 104 is depicted according to an embodiment of the invention. FIG. 2C depicts a cross-sectional view of the brushless motor 104. As shown in these figures, in an exemplary embodiment, the brushless motor 104 includes Hall board mount assembly 210, a stator assembly 230, a rotor assembly 250, and a ring gear mount 270.

The Hall board assembly includes a Hall board mount 212 and a Hall board 214. The Hall board 214 snaps onto the Hall board mount 212 via a plurality of pins 216, which may then be welded over the Hall board 214. The Hall board mount 212 includes a bearing support 218 that receives an end bearing 252 of the rotor assembly 250 (discussed below). Mounted on the Hall board 214 are one or more Hall Effect sensors 220 arranged around the circumference of the bearing support 218. The Hall board mount 212 further includes a Hall Effect Sensor interference 222 that is coupled to the control unit 106 to provide the control unit 106 with Hall Effect sense signals.

The stator assembly 230 includes a stator 240 having a plurality of stator windings 232 housed in a stator lamination stack 242. In a six-pole three-phase brushless electric motor, as shown in this exemplary embodiment, three stator windings 232 are provided within the lamination stack 242. Each stator winding 232 is distributed around the lamination stack 242 to form an even number of poles. In a six-pole stator, each stator winding 232 includes a pair of windings arranged at opposite ends of the lamination stack 242 to face each other. The stator windings 232 may be connected in a variety of configurations. Exemplary configurations include a series delta configuration, a parallel delta configuration, a series wye configuration, and a parallel wye configuration. The distinguishing characteristics of these configurations will be discussed later in detail. The stator assembly 230 further includes a bus bar 234 coupled to the control unit 106 to receive DC power from the control unit 106 to power the field windings 232. Using the bus bar 234 and based on the input from the Hall Effect sensors 218, the control unit 106 sequentially commutates the stator windings 232 to drive the rotor 254. In addition, the stator assembly 230 includes a baffle 236 coupled to the stator 240 via snaps or pins 238. The baffle 235 may include a protrusion 236a at its low end to contain the wiring connections from the bus bar 234 to the stator windings 232. Alternatively, the baffle 235 may itself integrally include the bus bar 234 to input power from the control unit 106.

Figure 3A:
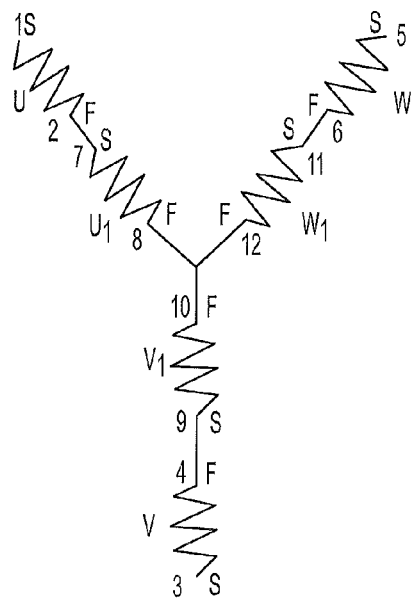
FIGS. 3A-3C depict various configurations for connecting stator windings of a brushless motor.
Figure 3B:
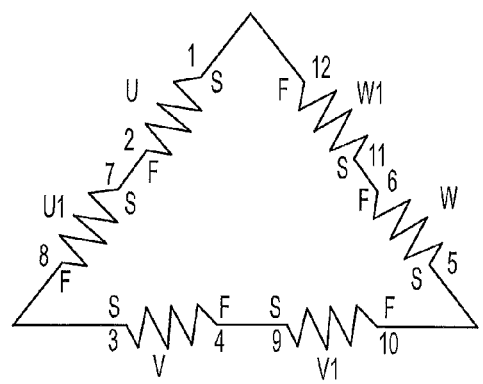
Figure 3C:
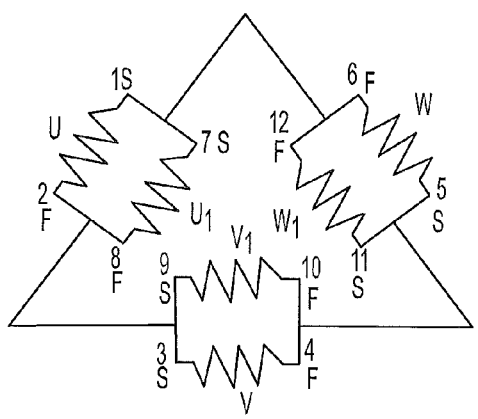
Figure 4:
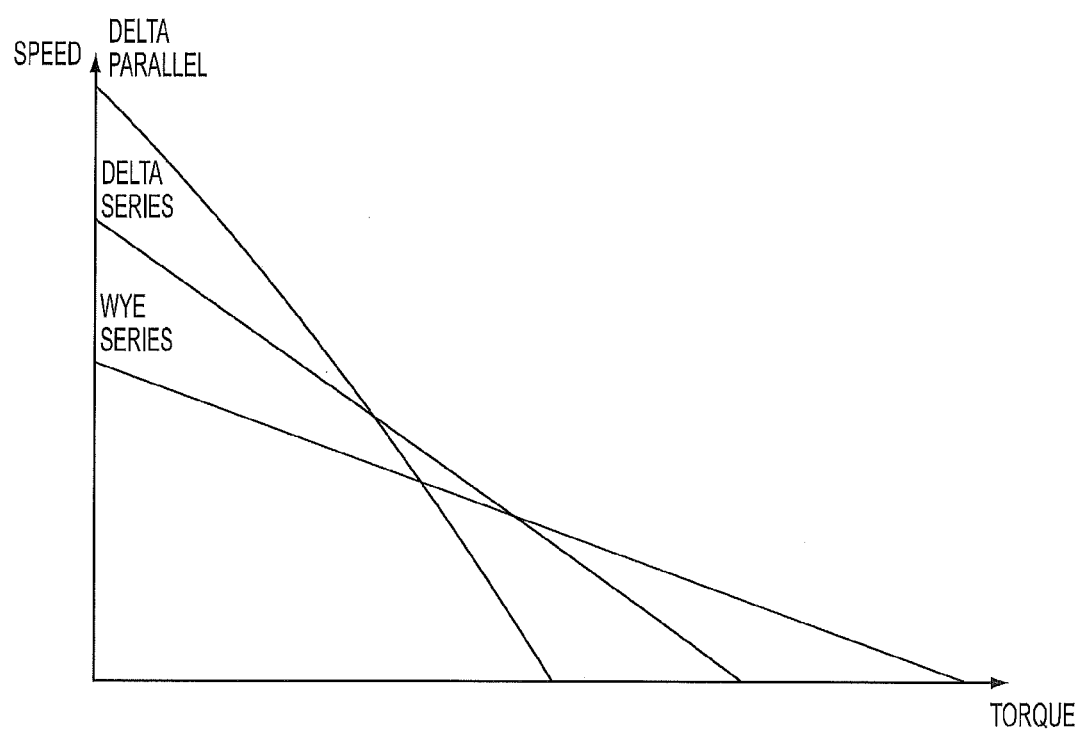
FIG. 4 depicts an exemplary speed-torque diagram of a brushless motor with different stator winding configurations.

FIGS. 3A-3C show different stator windings 232 connections used to achieve the series wye ("Y" shaped) (FIG. 3A), series delta (FIG. 3B), and parallel delta (FIG. 3C) configurations. A parallel wye configuration may also be achieved, although such configuration is not explicitly shown. The three stator windings in a six-pole brushless motor are typically designated as U-$U_1$; V-$V_1$; and W-$W_1$ windings, where each winding includes two poles (U and $U_1$, for example, designate two poles of the same winding). The wye configuration, sometimes called a star winding, connects all of the windings to a neutral (e.g., ground) point and power is applied to the remaining end of each winding. The delta configuration connects the three windings to each other in a triangle-like circuit, and power is applied at each of the connections. For a given motor, the delta configuration achieves higher speed (rpm) at lower torque, whereas the wye configuration achieves relatively higher torque at lower speed. The parallel delta configuration achieves the even higher speed at lower torque load. FIG. 4 depicts an exemplary speed-torque diagram of a brushless motor having these configurations.

In a typical off-the-shelf stator assembly for an electric brushless motor, the poles of each stator windings 232 (i.e., U and $U_1$, V and $V_1$, and W and $W_1$) are arranged opposite one another and are wound using a single wire during the manufacturing process. Specifically, the stator housing typically includes pre-routed wiring connections that connects terminals 2 (U) and 7 ($U_1$), terminal 4 (V) and 9 ($V_1$), and terminals 6 (W) and 11 ($W_1$) around or adjacent to the stator lamination stack 242 (See FIG. 5A). The remaining terminals may then be wired to achieve the desired configuration, i.e., delta or wye, in series or in parallel.

Figure 5A:
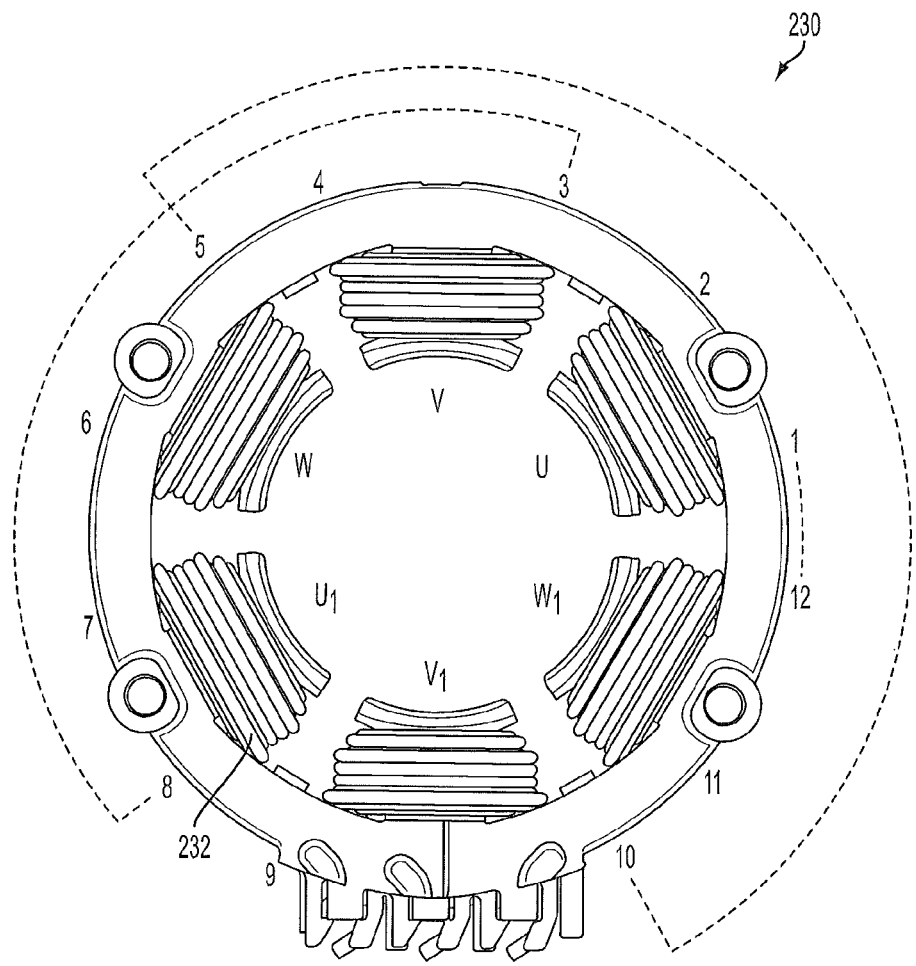
FIGS. 5A and 5B depict a motor stator connected to achieve a delta configuration, according to an embodiment of the invention.

Conventionally, in a six-pole motor, three adjacent poles are designated as U, V, and W, opposite the corresponding $U_1$, $V_1$, and $W_1$ poles of the same winding 232. FIG. 5A depicts the brushless motor 104 with this arrangement. A challenge with this arrangement, however, is that terminals 1 (U) and 12 ($W_1$), terminals 5 (W) and 10 ($V_1$) and terminals 3 (V) and 8 ($U_1$) must be wired together to obtain the delta configuration. It is easy to wire terminals 1 and 12 to each other, as they are located adjacent to one another. However, connecting terminals 5 and 10 and terminals 3 and 8 require wiring around the circumference of the stator 240. Furthermore, some conventional designs utilize a printed circuit board attached to the stator to facilitate the connections between the stator terminals, but the copper tracks of the printed circuit board are typically insufficient in handling large amounts of current in heavy duty power tool applications, such as drills or other high torque power tools.

Figure 5B:
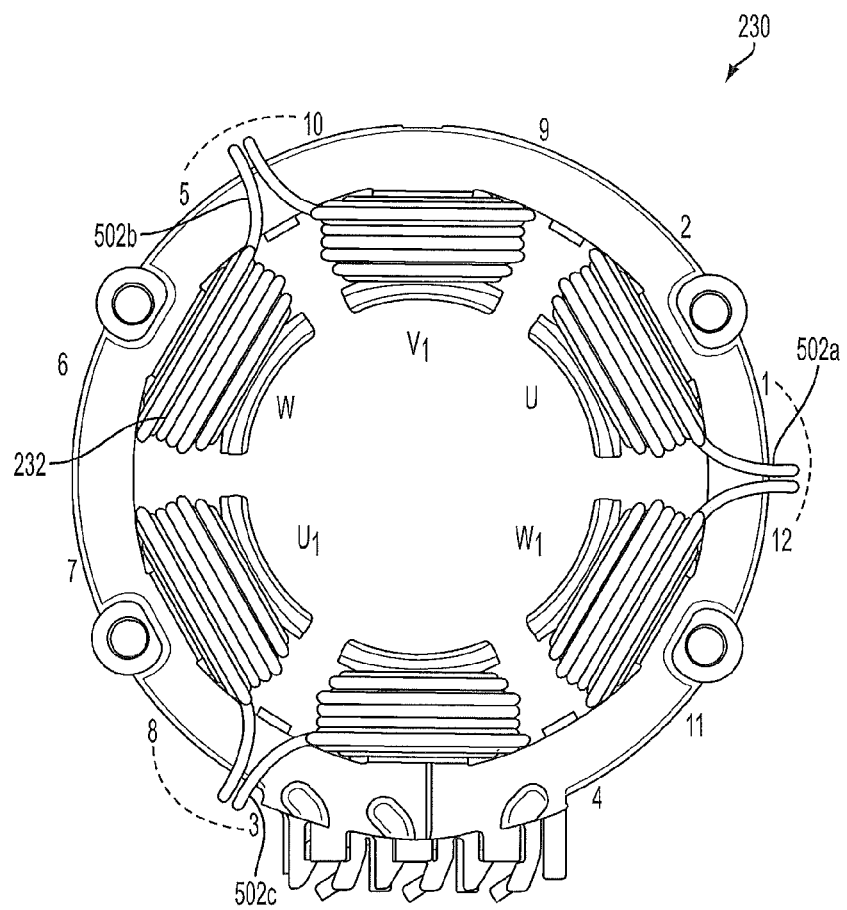

In order to overcome this challenge, according to an alternative embodiment of the invention shown in FIG. 5B, the poles of the stator windings are designated such that the terminals required for wiring a delta connection are arranged adjacent to one another. For example, in an exemplary embodiment, the designation of the stator windings poles V and $V_1$ are switched such that terminals 5 and 10 as well as terminals 3 and 8 fall adjacent to one another. Accordingly, the terminals can be connected easily without the need for extra wiring through the center or around the circumference of the stator 240. The stator windings 232 can be comprised of one continuous coil tapped at three connection points 502a, 502b, 502c for connecting the stator windings 232 to the bus bar 234. This arrangement significantly simplifies the motor winding process.

FIGS. 5C-5H depict the details of the bus bar 234 and the wiring of the stator assembly 230, according to an embodiment of the invention.

Figure 5C:
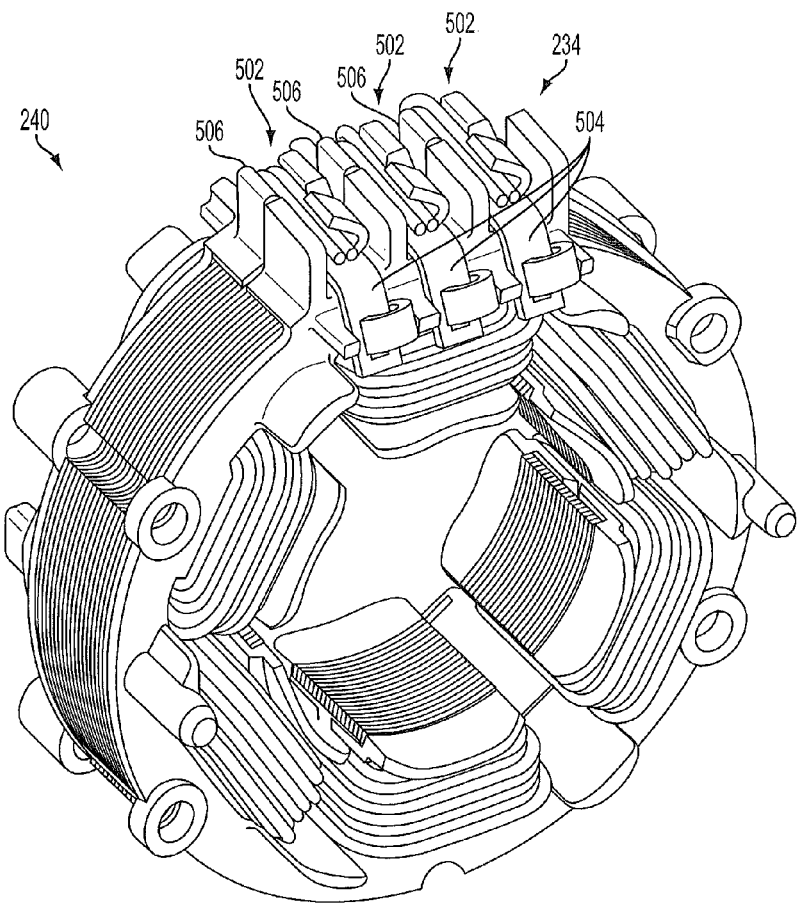
FIG. 5C depicts the bus bar connection of a stator assembly, according to an embodiment of the invention.
Figures 5D, 5E:
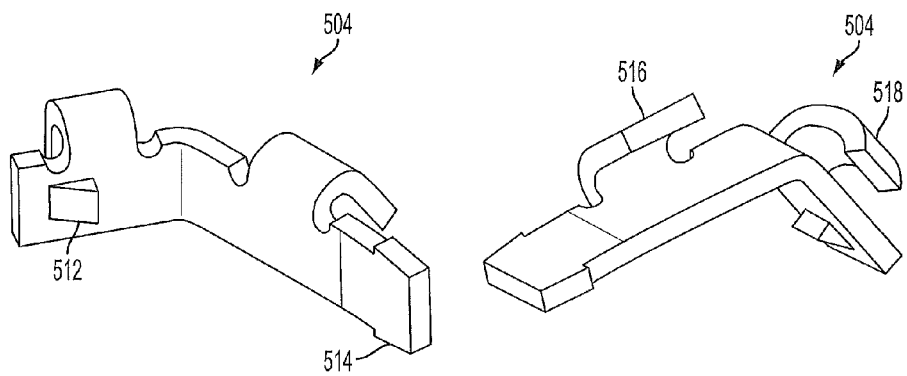
FIGS. 5D-5H depict conductive plates of the bus bar of FIG. 5C and wire connections thereto, according to an embodiment of the invention.

As shown in FIG. 5C, the bus bar 234 includes at least three input terminals 502 corresponding to each of the stator windings U, V and W. In an exemplary embodiment, the input terminals 502 comprise conductive plates 504 separated by insulating channels 506. The conductive plates 504 may be made of, for example, brass material or other conductive metal. As shown in FIG. 5D, each conductive plate 504 may include one or more barb features 512, 514 for attaching the conductive plates 504 inside the insulating channels 506. Further, as shown in FIG. 5E, conductive plates 504 may include hooks 516 for routing wires from the stator windings to the conductive plates 504. The conductive plate 504 may also include hooks 518 for accommodating the wires from the control unit 106 to the conductive plates 504.

Figure 5F:
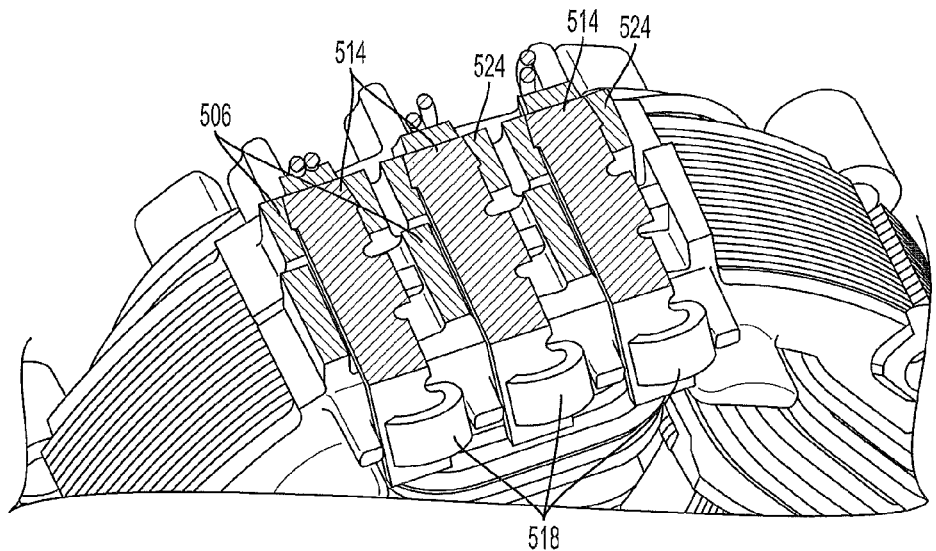
Figure 5G:
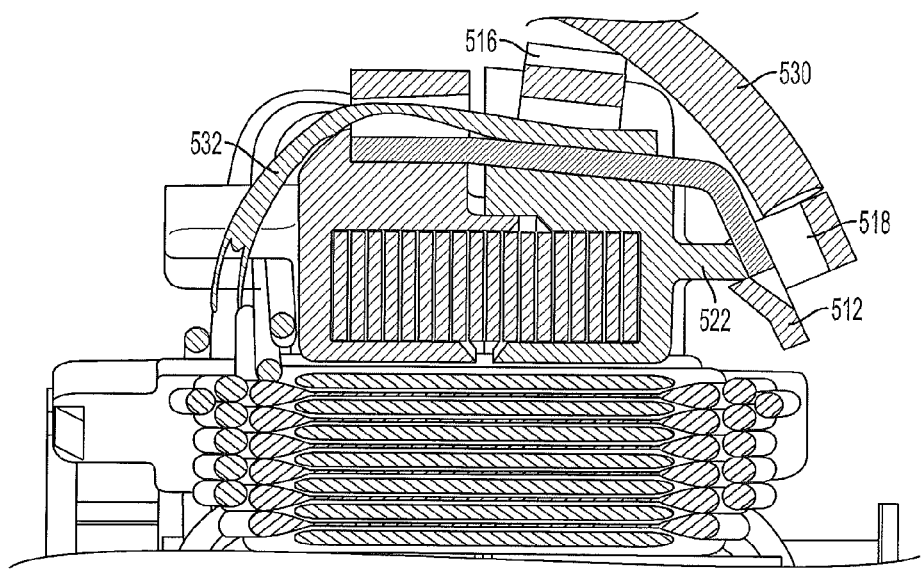
Figure 5H:
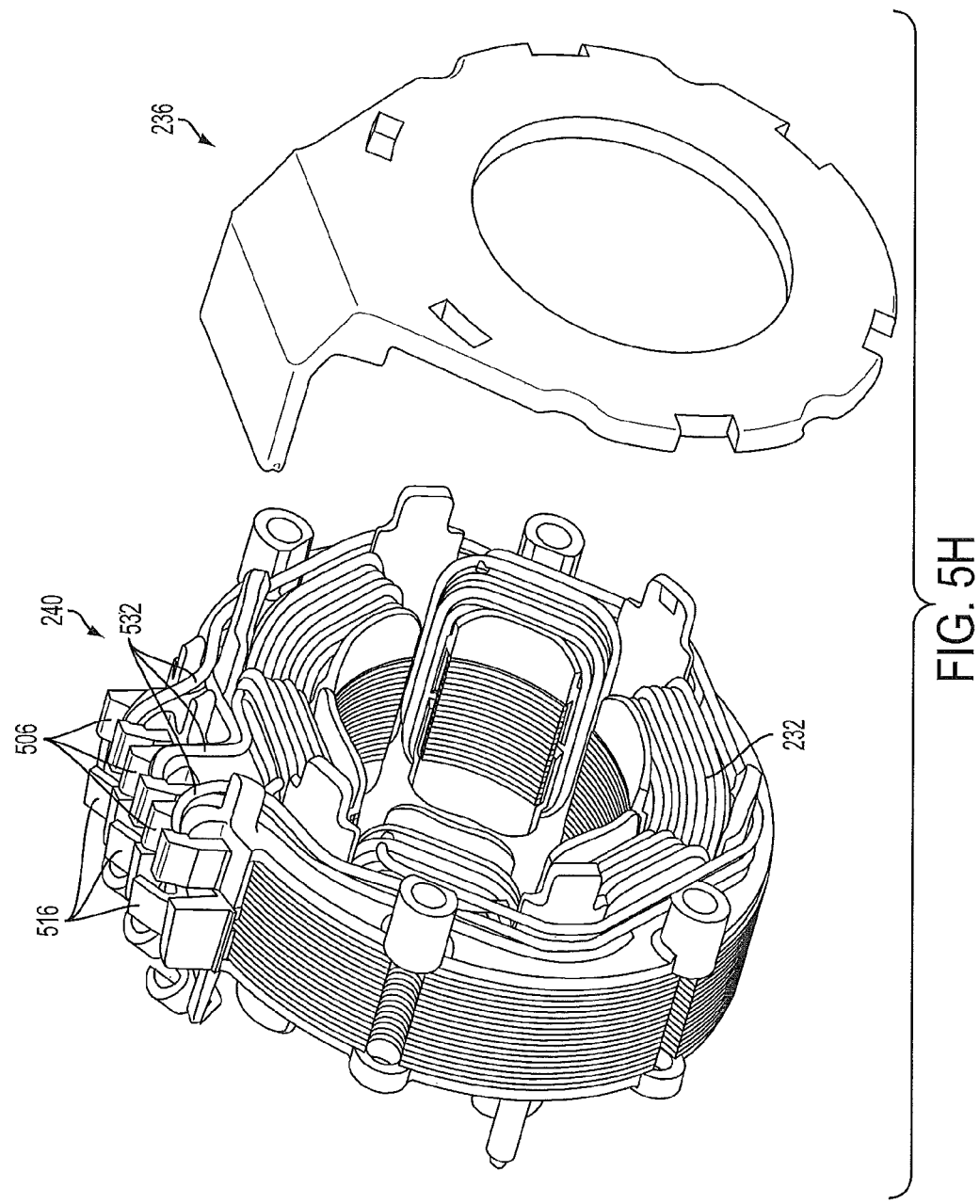

As shown in FIG. 5F, the barb features 514 of the conductive plates 504 snap into corresponding receiving slots 524 inside the insulating channels 506. The insulating channels 506 are shown in this figure without the walls separating the channels 506. Further, as shown in cross-sectional view of FIG. 5G, the barb features 512 engage protrusions 522 of the insulating channels 506 to lock the conductive plates 504 within the insulating channels 504. Wires 530 from the control unit 106 may be soldered or attached by other means inside the hooks 518. Similarly, wires 532 from the stator windings 232 may be soldered or otherwise attached inside the hooks 516. FIG. 5H depicts an expanded view of the stator assembly 230 including the wires 532 leading from the stator windings 232 and through the insulating channels 506 into the hooks 516.

As discussed above, according to an exemplary embodiment, the stator windings 232 can be connected vie wire connections arranged around the stator 240. In an alternative embodiment, according to an aspect of the invention, the baffle 236 may include a series of metal routings stamped or adhesively connected onto the front face of the baffle 236 to connect the desired terminals of the stator 230. The metal routings may be, for example, made out of brass or other electrically conductive material.

Figure 6A:
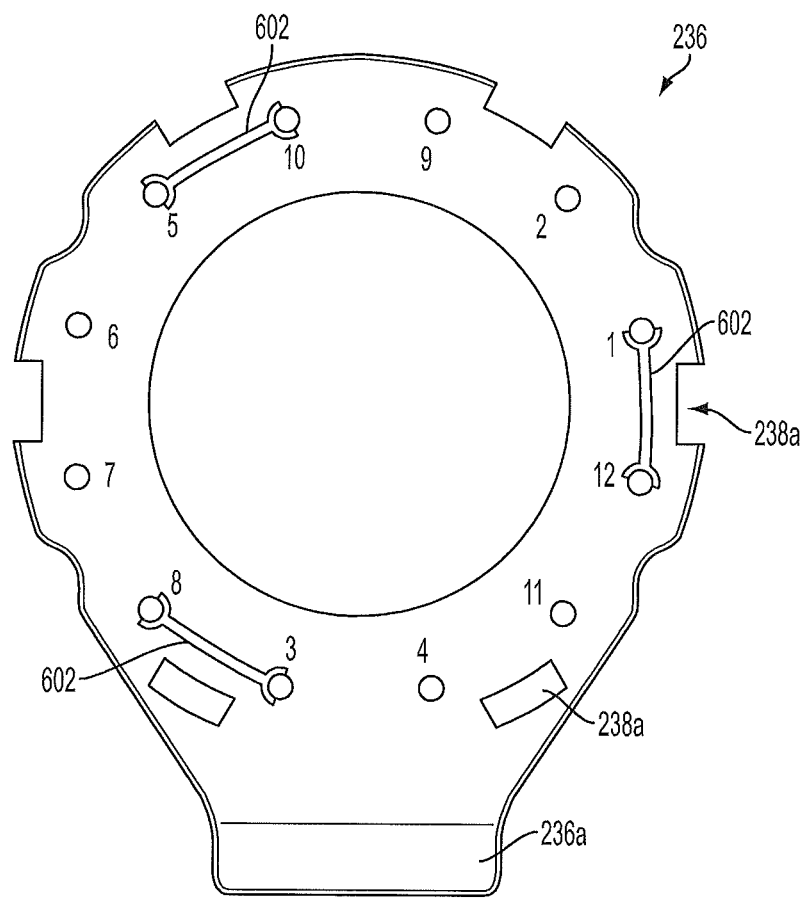
FIGS. 6A and 6B depict a baffle having conductive stampings to achieve a delta and a Wye configuration, respectively, according to an embodiment of the invention.
Figure 6B:
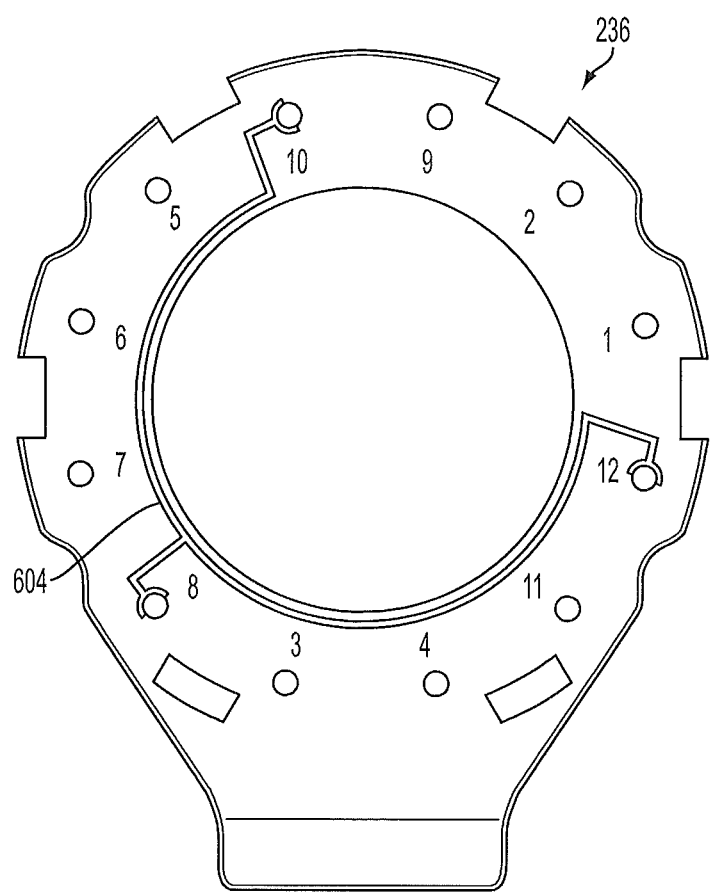

FIG. 6A illustrates an example of a baffle 236 having metal stamping 602 to achieve a series delta connection for the stator 240. The terminals 1-12 of the baffle 236 correspond to and are electrically connected to terminals 1-12 of the stator 240. Slots 238a on the baffle 236 are provided to receive the snaps 238 from the stator 230. In this example, the metal stampings 602 on the baffle 236 connect terminals 1 and 12, 5 and 10, and 8 and 3 to accommodate a series delta connection as previously described. Alternatively, as shown in FIG. 6B, the baffle 236 could include metal stampings 604 connecting terminals 10, 8 and 12 to accommodate a series wye connection.

Referring back to FIGS. 2A-2C, the rotor assembly 250 includes an end bearing 252, a rotor 254, a rotor lamination stack 256, a magnet retaining cap 258, an end cap 260, and a fan assembly 262. The rotor lamination stack 256 houses a series of permanent magnets (PMs). In an exemplary embodiment, a set of four PMs may be provided. Adjacent PMs have opposite polarities such that the four PMs have, for example, an N-S-N-S polar arrangement. The rotor 254 is securely fixed inside the rotor lamination stack 256. The end bearing 252 provides longitudinal support for the rotor 254 in the bearing support 218 of the Hall board mount assembly 210. As the stator windings 232 are energized and deenergized by the control unit 106, the PMs are repelled and/or attracted to turn the rotor assembly 250 inside the stator assembly 230.

The Hall Effect sensors 220 provide the control unit 106 with the signals indicating the position of the PMs, which allows the control unit 106 to energize the appropriate stator windings 232.

Figure 7A:
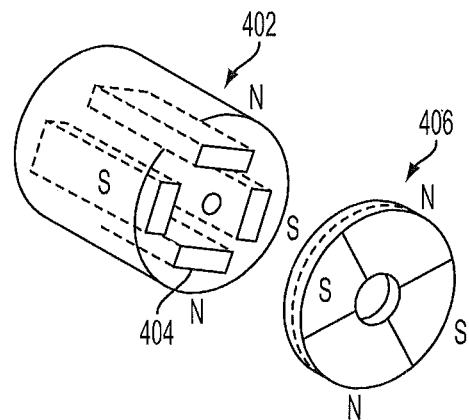
FIG. 7A depicts a prior art rotor and an accompanying sense magnet.

In conventional designs, as shown in FIG. 7A, sensing arrangement for brushless motors includes a lamination stack 402 that is the same length as the permanent magnets 404. In addition, there is provided a separate sense magnet 406 that is coupled to the end of the lamination stack 402. The sense magnet 406 includes four poles (N-S-N-S), which must be precisely aligned with the four permanent magnets 404 of the lamination stack 402. The sense magnet 406 is positioned relative to the Hall Effect sensors (not shown) in such a way that the polarity of the sense magnet 406, and therefore the position of the rotor, can be sensed with precision by the Hall Effect sensors. This sense magnet 406 may or may not have an additional back iron plate (not shown) depending on the strength of the magnet and/or the sensitivity of the Hall Effect sensor. The sense magnet 406 may also include a mounting mechanism (plastic housing or mounting disc), which orients the alignment of the sense magnet 406 to the permanent magnets 404. The magnetic orientation of the sense magnet 406 is axial and perpendicular to the longitudinal magnetic orientation of the permanent magnets 404.

The problem arising from this arrangement is aligning the sensor magnet 406 with the permanent magnets 404. There are conventional designs that eliminate the sensor magnet altogether and extend the rotor lamination stack 402 along with the rotor magnets close to the Hall Effect sensor. These designs, however, suffer from the increase in the amount of space taken up by the rotor lamination stack 402. In fact, some of these designs extend the rotor lamination stack equally on each end in order to align the center of the rotor lamination stack with the center of the stator. Thus, if for example the stator is 10 mm long and the permanent magnets need to extend 3 mm to be properly sensed by the Hall Effect sensors, the entire length of the rotor lamination stack would have to be between 13 to 16 mm.

Figure 7C:
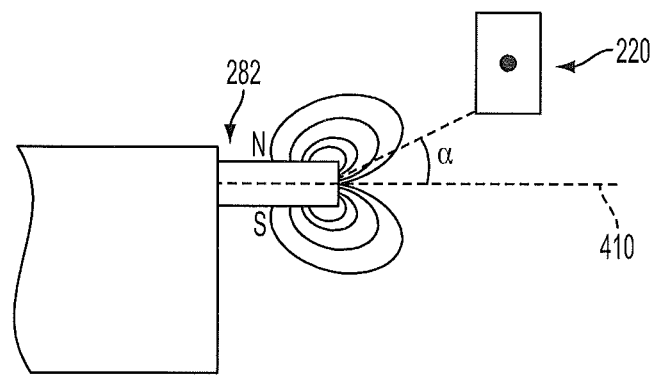
FIG. 7C depicts a cross-sectional view of the extended rotor magnets, according to an embodiment of the invention.
Figure 7B:
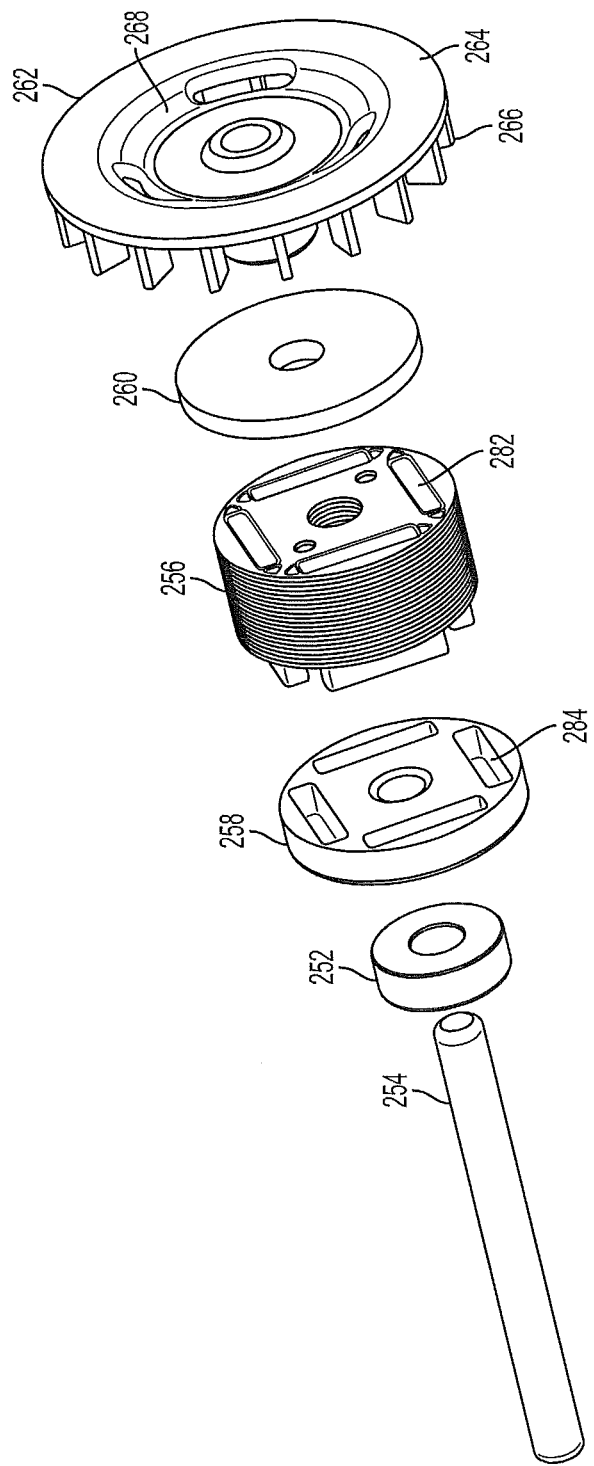
FIG. 7B depicts an expanded perspective view of a rotor assembly, according to an embodiment of the invention.

To overcome these problems, according to an embodiment of the invention, as depicted in FIG. 7B, a rotor stack 256 is provided with permanent magnets 282 that extend outward from the rotor lamination stack 256 only on one end towards the position of the Hall Effect sensors 220. The ends of these magnets 282 are used as the position sensing component for the Hall Effect sensors 220. The end cap 260 is placed on the opposite ends of these magnets 282 to prevent axial movement of the magnets 282 towards the fan 262. The magnet retaining cap 258 is arranged at the other end of the rotor lamination stack 236 to prevent axial movement of the magnets 282 towards the Hall board assembly 210 and radially capture the extended portion of the magnets 282. Both the end cap 260 and the magnet retaining cap 258 may be made of plastic or other insulating material. The magnet retaining cap 258 includes slots 284 which tightly capture the magnets 282. In an embodiment, the magnet retaining cap 258 may be molded, snapped onto, or welded onto the rotor lamination stack 256.

According to this embodiment, since the magnetic flux of the magnetic orientation of the permanent magnets 282 is longitudinal, the Hall Effect sensors 220 has to be optimally positioned such that they only intersect and sense the north or south flux of the magnet, but not both. Specifically, each of the Hall Effect sensors 220 has to be arranged at an angle α from an axis 410 of the corresponding permanent magnet 282. If the Hall Effect sensors 220 are too close to the axis 410, it may incorrectly sense an N magnet as an S magnet or vice versa.

The angle α may vary depending on the specific motor design and the strength of the Hall Effect sensors 220. This arrangement is depicted in FIG. 7C.

Referring back to FIGS. 2A-2C the fan assembly 262 is discussed herein, according to an embodiment of the invention.

Brushless motors were conventionally provided with a motor fan including a straight fan plate that expands over the height of the motor. Fan blades extend longitudinally from the fan plate. While the presence of the motor fan is important for cooling the motor, the space occupied by the blades increases the length of the motor. The fan assembly 262, according to an embodiment of the invention, minimizes the amount of space taken up by the fan blades. Specifically, the fan assembly 262 includes a fan plate 264 and a set of fan blades 266 arranged around the edge of the fan plate 264 facing the stator 240. The back portion of the fan plate 264 faces an end cap 278 of the ring gear mount 270. The fan plate 264 is securely fastened to the rotor 254 via an encapsulation portion 268. According to an embodiment, a middle portion of the fan plate 264 is contoured as shown in FIG. 2C to accommodate a projecting portion 276 of the end cap 278 of the ring gear mount 270. This allows the outer portion of the fan plate 264 that supports the fan blades 266 to nest inside the ring gear mount 270 adjacent the end cap 278. This arrangement can save the overall motor length by 1-5 millimeters. In alternative embodiments, where a conventional ring gear mount is utilized instead of the integrated ring gear mount 270 (discussed below), the fan plate 264 may be contoured to nest the outer portion of the fan plate 264 within transmission housing above the end bearing 274.

The ring gear mount 270 is herein described by referring again to FIGS. 2A-2C, according to an embodiment of the invention.

Figure 8:
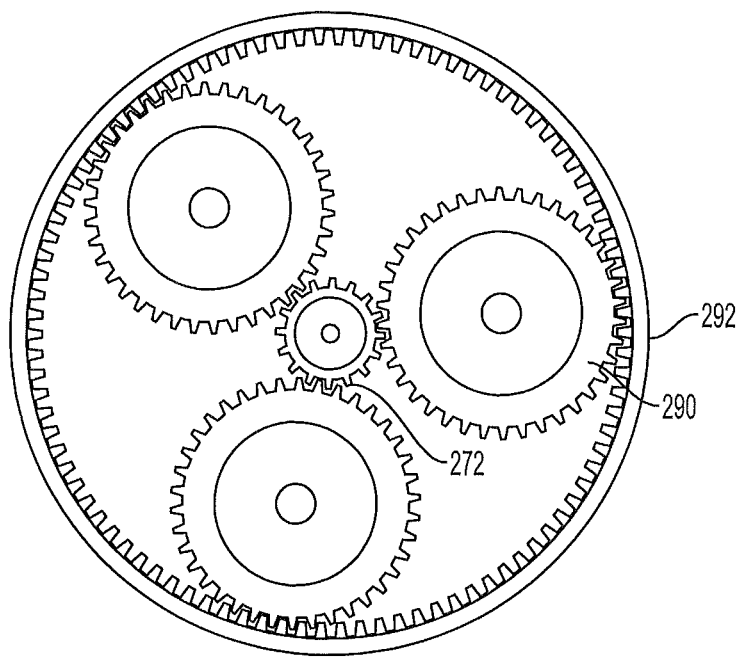
FIG. 8 depicts an exemplary conventional gear arrangement inside a transmission assembly.

In electric power tools, the transmission assembly 114 having a planetary gear system is typically manufactured and assembled separately from the motor assembly 104. The housing 102 of the power tool contains and holds both assemblies together. The transmission assembly 114, as shown in FIG. 8, includes a pinion (sun) gear 272, a set of at least two usually two to three) planetary gears 290, and a ring gear 292. The pinion 272, which is attached to and rotates along with the rotor 154, engages the planetary gears 290. The planetary gears 290 in turn engage the inside teeth of the ring gear 292. In some embodiments, the planetary gears 290 may be attached to a planet carrier plate (not shown), which engages the ring gear 292.

Conventionally, the pinion 272 is attached to the motor rotor and is manufactured and assembled as a part of the motor assembly. The rotor is housed inside the motor assembly via a bearing. The ring gear 292 is housed via a ring gear mount inside the transmission assembly. During the assembly process, the center of the ring gear 292 must be aligned with the motor rotor to fit the pinion 272 inside the transmission assembly. This alignment is often expensive and burdensome.

To simplify this process, according to an embodiment of the invention, the ring gear mount 270 is integrated as a part of the motor assembly 104. The ring gear mount 270 integrally includes the end cap 278 for the motor 104 on one side and is shaped to further include support portions 294, 296 to respectively provide support for the planetary gears 290 and ring gear 292 on the other side. The ring gear mount 270 also encapsulates the end bearing 274 via the projecting portion 276 to support the rotor 254. In an embodiment, the end bearing 274 and the ring gear mount 270 are integrally manufactured as one piece. This substantially simplifies the assembly process, as the ring gear mount 270 ensures proper alignment of the planetary gears 290 and the ring gear 292 with the pinion 272.

Figure 9:
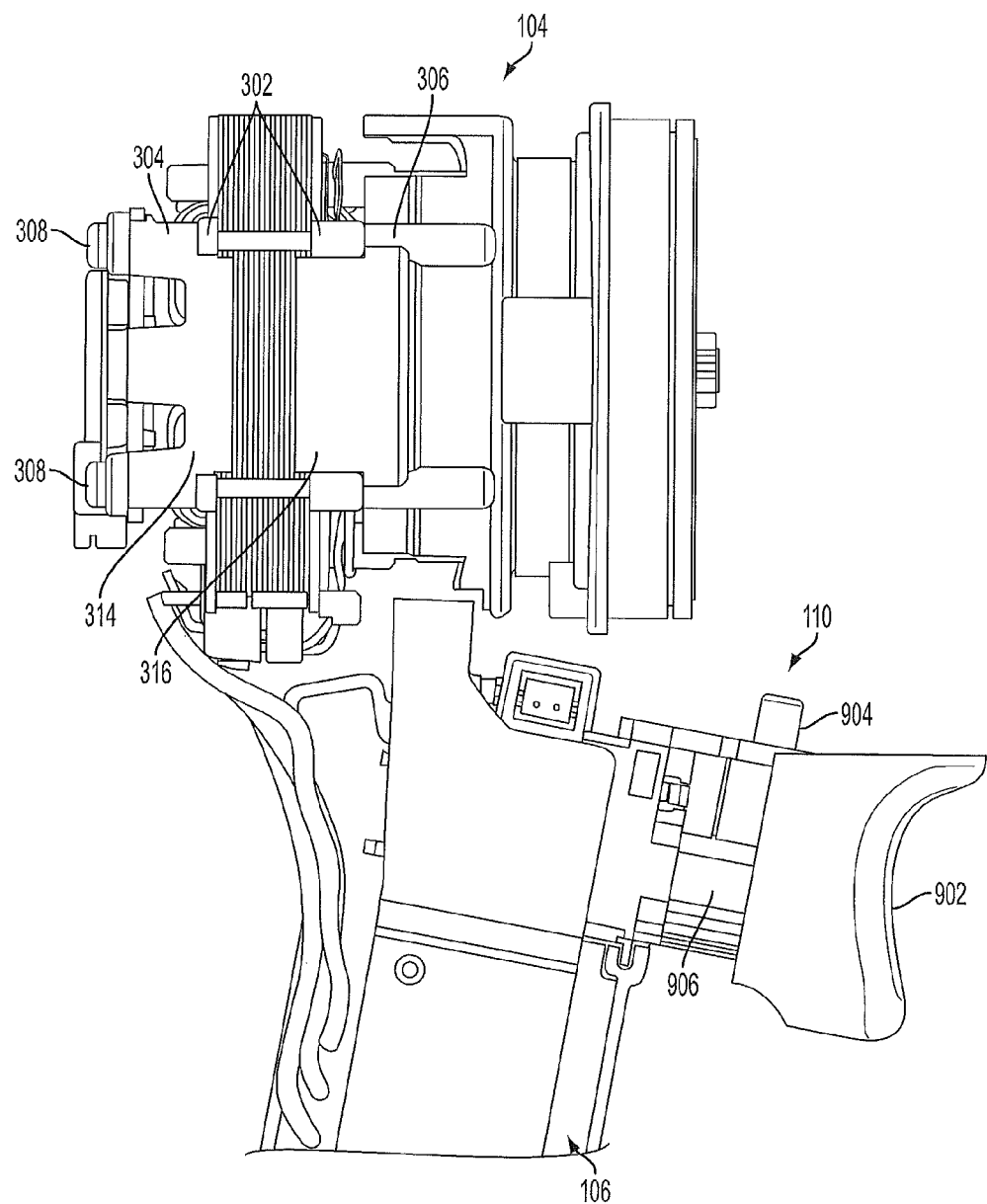
FIG. 9 depicts a cross-sectional view of the motor and the control unit, according to an embodiment of the invention.

Another aspect of the invention is discussed with referenced to FIG. 9, which illustrates the assembled view of the motor 104, and further in reference with FIGS. 2A and 2B. As shown in these figures, the stator assembly 230 is provided with receptacles 302 around the stator 240. Similarly, the Hall board mount assembly 210 and the ring gear mount assembly 270 include receptacles 304 and 306, respectively, that align with the receptacles 302 of the stator 240. In order to assemble the components of the motor 104 together, the rotor assembly 250 is fitted inside the assembly 230, the end bearing 252 is fitted inside the bearing support 218, and the rotor 254 is fitted inside the end bearing 274 of the ring gear mount assembly 270. A series of fasteners 308 pass through the receptacles 302 and 304 from the back end of the Hall board mount assembly and fasten into the receptacle 306 of the ring gear mount assembly 270 to complete the assembly of the motor 104.

In order to ease the alignment of the various sub-assemblies during the motor assembly process, various alignment features are provided according to an exemplary embodiment of the invention, as shown in FIGS. 2A and 2B. These alignment features are helpful during the assembly process, as they allow the sub-assemblies to be aligned with precision prior to insertion of fasteners 308. These alignment features include pins 310 on the two sides of the stator 240 and corresponding pin receptacles 312 on the Hall board mount assembly 210. Additionally, bridges 314 and 316 are provided on the Hall board mount assembly 210 and the ring gear mount assembly 270, respectively. These bridges can be placed fittingly between the upper and lower receptacles 312 of the stator assembly 230, as shown in FIG. 9. These alignment features help secure the various sub-assemblies in their desired position prior to tightening the fasteners 308 to complete the assembly process of the motor 104.

The control unit 106 and the input unit 110 are discussed herein, according to an embodiment of the invention.

Referring back to FIG. 1, the control unit 106 is placed inside the handle 102 of the tool, according to an exemplary embodiment. This location provides numerous advantages over conventional locations for the control module near the battery pack 108 or near the motor 104. Placement of the control unit 106 inside the handle 102 minimizes the interconnections between the variable speed trigger 902/906 and the FWD/REV lever 904 of the input unit 11 and the control unit 106. This placement also reduces the length of wire connections required between the battery pack 108, the control unit 106, and the motor 104. This results in lower cost, less complex assembly, and increased reliability of the system. The location of the control unit 106 also reduces the overall length of the tool as compared to configuration where location of control unit is behind or in the vicinity of the motor 104.

Conventionally, various components of the control unit were placed and routed together over a single Printed Circuit Board (PCB). While this approach may have been practical where the control unit were positioned near the motor, space limitation becomes an issue when the control unit is placed inside the handle. The ever-increasing demand for the better ergonomics, as well as the need to enable users with various hand sizes to grip the tool comfortably, has led to smaller and smaller handles of the tool. The aforementioned space limitation is more predominant in brushless motor control, where the control module has a lot more elements than a standard control. In case of brushless motor, the control unit commutates the motor and controls all aspects of the battery, input unit, and/or motor control. For example, the control unit controls the power to the motor, provides other control function such as two speed selection and also provides secondary outputs such as LEDs, etc. Placing all the control unit components on a single PCB inside the handle would substantially increase the length of the handle.

Other conventional designs utilize two separate boards for the control components and power components. The board carrying the power components in these designs is placed behind the motor and the board carrying the control components is placed inside the handle or at the foot of the power tool. These designs also have several disadvantages. For example, the placement of the power components behind the motor increases the length of the power tool.

Figure 10A:
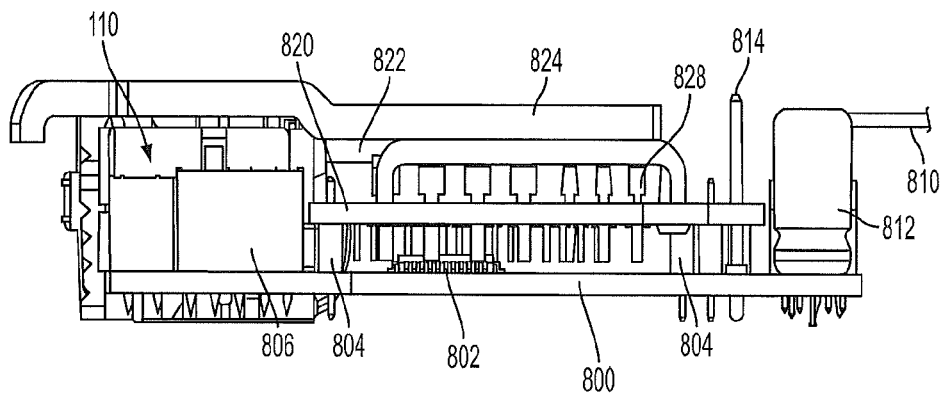
FIGS. 10A and 10B depict cross-sectional and perspective views of a control unit and an integrated input unit, according to an embodiment of the invention.
Figure 10B:
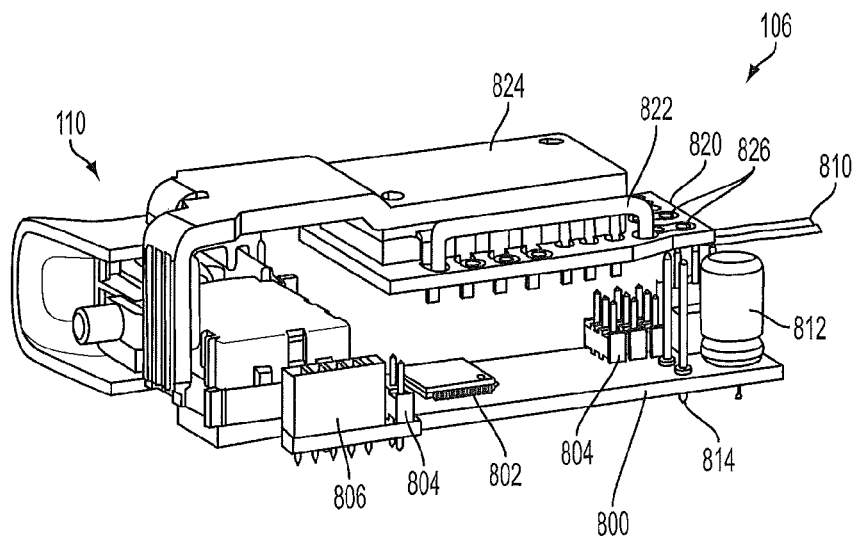

According to an embodiment of the invention, as shown in the cross-sectional view of FIG. 10A and the expanded perspective view of FIG. 10B, in order to package the total control unit 106 inside the handle 102, a two-board solution concept is provided. As shown in these figures, the control unit 102 includes a control circuit board 800 arranged in parallel to a power circuit board 820. In an embodiment, the power circuit board 820 is mounted on the control circuit board 800. The two boards are interconnected via the support pins 828, 814, 804, which also provide various control signal and power connections between the two boards. This arrangement minimizes the length of the control unit 106.

The control circuit board 800 includes a micro-controller 802. In an exemplary embodiment, the micro-controller 802 may be a programmable microprocessor, controller, or digital signal processor. The control pins 804 are coupled to the micro-controller 802 and the power circuit board 820. The control circuit board 800 also includes a Hall bus interface 806, which is couples the micro-controller 802 to the Hall Effect sensor interface 222 of the Hall board mount 212. The control circuit board 800 is coupled to the battery pack 108 via power inputs 810. Power pins 814 provide power, as managed by the controller 802, to the power circuit board 820. Also provided on the control circuit board 800 is a bulk capacitor 812 coupled to the power inputs 810 to minimize the effect of the parasitic inductance of the battery pack 801 power connections.

The bulk capacitor 812 is typically used in power tool control units for reducing the variation in voltage supplied to the power module from battery. The capacitance and voltage requirement from the bulk capacitor 812 is such that the electrolytic capacitor package size always poses a challenge for packaging. In conventional designs, the capacitor would be mounted on a separate printed circuit board with flying leads used for connecting it to the control module. Sometimes the capacitor would be manually soldered to the terminals of the control module. All these conventional methods for packaging the capacitor pose issues due to lead breakage, wire breakage from the excessive vibration.

In order to overcome this problem, according to an embodiment, the power circuit board 820 is smaller in length than the control board 800 in order to allow the bulk capacitor 812 and the input unit 100 to be mounted on the control circuit board 800 adjacent the power circuit board 820. The capacitor 812 is connected to the power circuit board 820 via dedicated power pins 814. By mounting the capacitor 812 on the control board, the capacitor 812 can be easily accommodated inside the handle. This also allows the capacitor to be soldered using wave soldering just like any other through-hole components on the control circuit board 800.

The power circuit board 820 primarily includes a smart power module ("SPM", also referred to as intelligent power module) 822, according to an embodiment. SPM 822 is an integrated circuit including six power MOSFETs that power the stator windings 232 of the motor 104, as well as the gate drivers, bootstrap circuit, and all other components needed to drive the MOSFETs. The internal circuitry of the SPM 822 is beyond the scope of this disclosure and is not discussed in detail, but would be known to a person of ordinary skill in the art. Alternatively, it is possible to place and rout the power MOSFETs, gate drivers, and other circuitry directly on the power circuit board 820, according to an alternative embodiment. The power circuit board 820 further includes pins 828, which provide further control signal connections to the control circuit board 800, and pin receptacles 828 for connecting to the control pins 804 and power pins 814.

Thermal performance of the control unit 106 is an important aspect of the design and has conventionally been a limiting factor in the operation of the tool. Power tool applications require significant amounts of power and thus significant amounts of current flow through the control and power components as well as through the motor, thus generating a lot of heat. Placing the control unit 106 generates a significant amount of heat, which is particularly dissipated from the power MOSFETs of the SPM 822, inside the handle 112. This placement is particularly challenging since there is virtually no airflow inside the handle 112.

Figure 11:
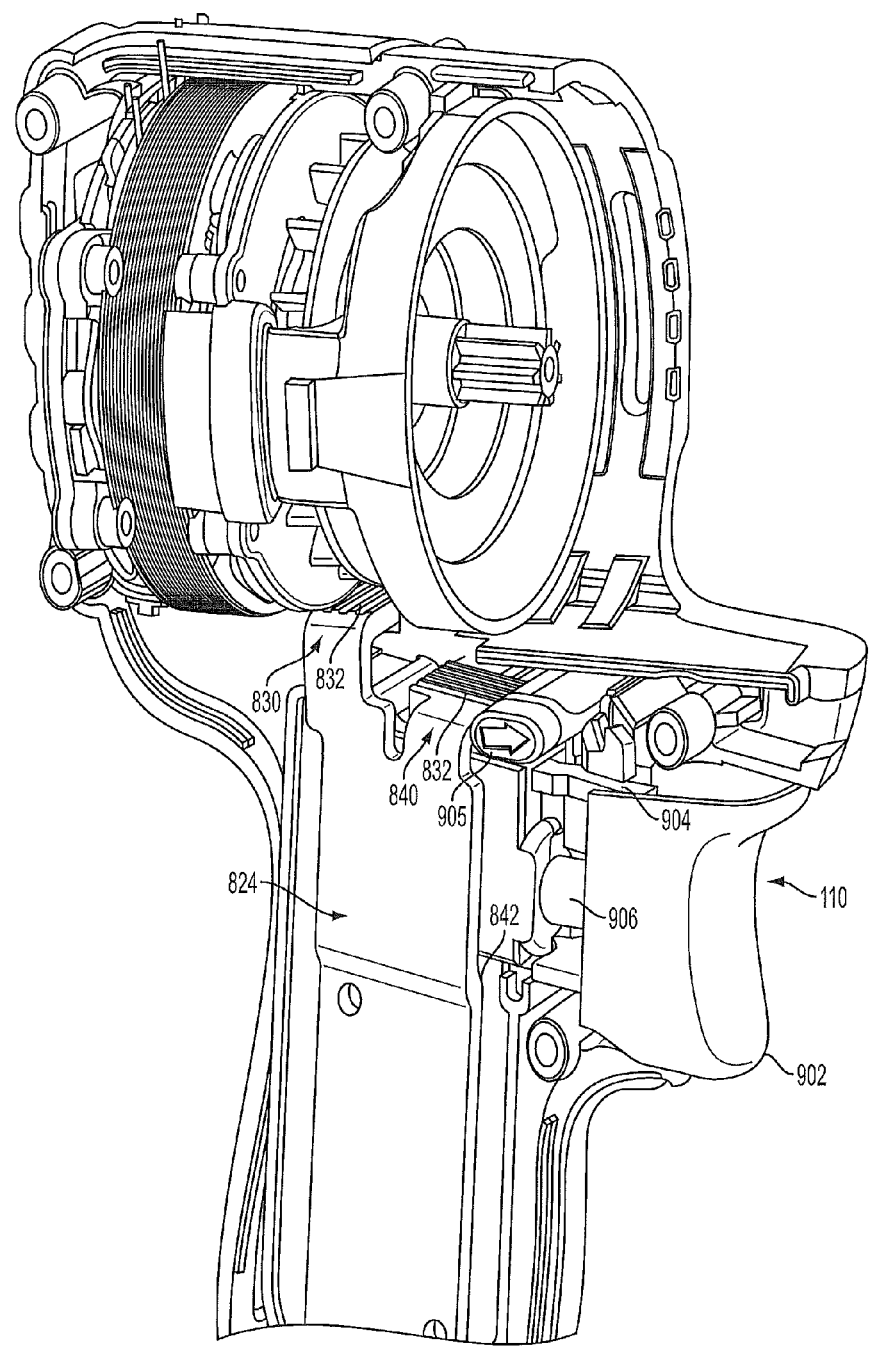
FIG. 11 depicts a perspective view of the power tool detailing the heat sink of the control unit, according to an embodiment of the invention.

According to an embodiment, in order to transfer heat efficiently away from the control unit 106, a heat sink 824 is provided, as shown in FIGS. 10A, 10B and 11. According to an exemplary embodiment, the heat sink 824 includes a stamped aluminum plate attached to the SPM 822. The heat sink 824 may include a protruded surface 842 to bypass the input unit 110. At the end of the protruded surface 842, according to an embodiment, there is provided a tab 830 projecting inward between the control unit 106 and the motor assembly 104. In one embodiment, the tab 830 is provided directly underneath the fan assembly 262 to carry the heat away from the control unit 106, particularly the SMP 822, into the airflow created by the fan assembly 262. The exhaust air from the fan assembly 262 blow directly over this tab 830 at high velocity providing high heat transfer coefficients, since heat transfer coefficient is function of flow velocity.

According to a further embodiment, a second tab 840 may be provided at the end of the protruding surface 842. The second tab 840 is bent near the forward/reverse switch 905 of the input unit 110. The gap around the forward/reverse switch 905, as well as the gap around the variable speed trigger switch 902, provides further airflow to transfer heat away from the tab 840. In a further embodiment, in order to increase the surface area of the tabs 830 and/or 840 and, consequently, improve the thermal transferability of the heat sink 824, a series of V-shaped grooves 832 are provided over the surfaces of the tabs 830 and/or 840.

Figure 12:
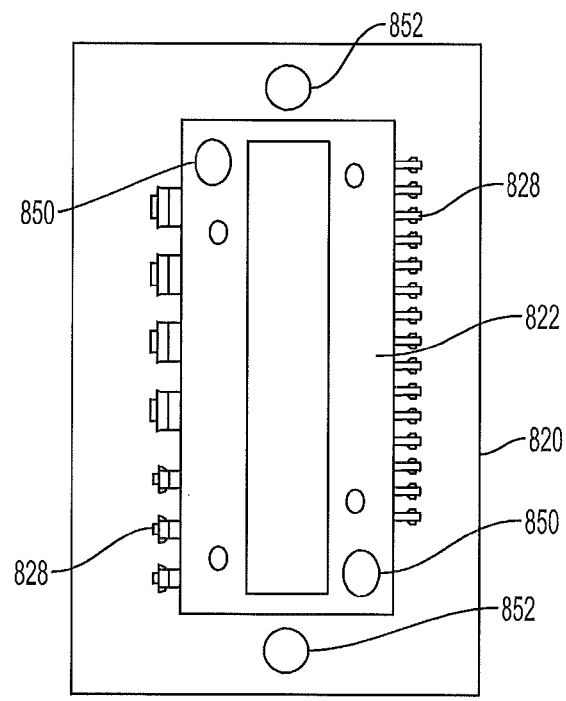
FIG. 12 depicts an attachment mechanism for the heat sink, according to an embodiment of the invention.

In order to decrease the overall length of the power circuit board 820, through-holes 850 for attachment of the heat sink 824 to the power circuit board 820 are provided directly on the SPM 822. This arrangement is depicted in FIG. 12. This arrangement is different from the conventional attachment mechanism, which required through-holes (denoted by reference 852) to be provided on the control circuit board 820 outside the area of the SPM 822. This arrangement allows reduced length of the power board 820.

Additional ways to improve thermal performance of the heat sink, according to an embodiment, includes providing air vents at the bottom of the handle 112 of the tool to improve air flow over the heat sink 824 and reduce the temperature rise. Furthermore, a series of fins can be provided on the heat sink base to further improve heat transfer from the heat sink.

Advantages of the thermal system described herein include higher heat transfer by achieving higher heat transfer coefficients and higher heat transfer flux per unit weight, thus providing a lighter system. Additionally, the above-described embodiments provide lower temperature for the power electronics components, resulting in better switching performance and increased reliability of the tool.

Figure 13:
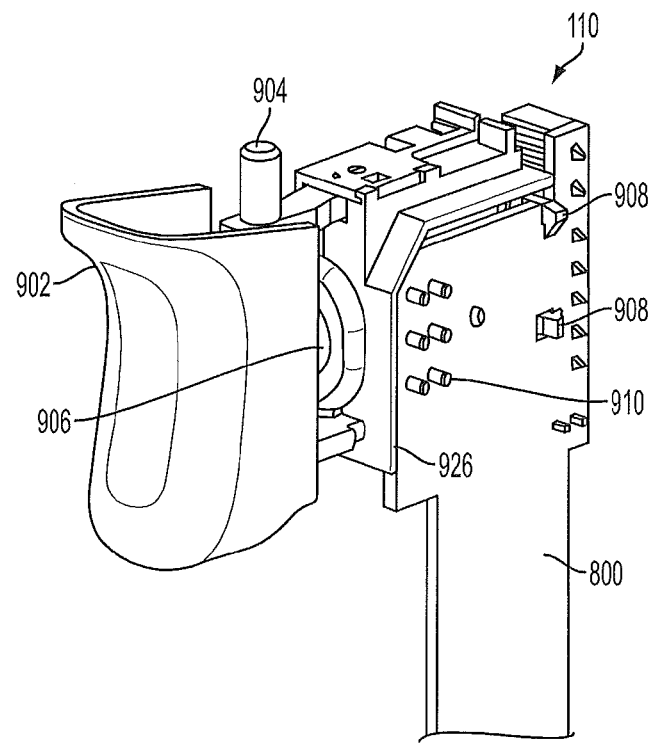
FIG. 13 depicts a perspective view of the input unit assembly mounted on the control circuit board, according to an embodiment of the invention.

Another aspect of the invention is discussed herein with reference to FIG. 13.

In conventional power tool applications, the input unit assembly (i.e., variable-speed switch assembly) is provided as a stand-alone unit and attached via wire connections to the control module. This is particularly due to the fact that most power tool manufacturers in the industry purchase switch assemblies from outside suppliers. This design requires wiring through the handle and/or other tool components. This makes the assembly complicated as well as reduces the reliability of system due to the possibility of failure in the interconnection.

As shown in this figure, according to an exemplary embodiment, the input unit 110, in this case a variable-speed switch assembly, is mounted directly on and integrated with the control circuit board 800. According to an embodiment, the variable-speed switch assembly 110 includes a trigger 902 connected to a variable-speed plunger 906. In an exemplary embodiment, the variable-speed plunger 906 is in turn coupled to a potentiometer, although other variable-speed sensing mechanism may also be utilized. The potentiometer is linearly actuated, meaning that as the user pulls the trigger, the potentiometer output varies linearly as the trigger is pulled. In an exemplary embodiment, the plunger 906 is connected to a wiper that slides over a series of resistive plates, which vary the output voltage of the variable-speed switch assembly 110 based on the position of the wiper. Furthermore, the variable-speed switch assembly 110 includes a forward/reverse lever 904 coupled to a forward/reverse switch 905 (FIG. 11). The variable-speed switch assembly 110 provides the micro-controller 802 with an on/off signal upon the actuation of the trigger 902. The variable-speed switch assembly 110 also provides the micro-controller 802 with forward/reverse signals based on the position of the forward/reverse lever 904, and a variable-speed voltage from the potentiometer. The micro-controller 802 controls the duty cycle of the motor 104 according to these inputs. As shown in FIG. 13, since the variable-speed switch assembly 110 is mounted directly on the control circuit board 800, these inputs can be provided via pins 910 without, using additional wiring. Tracks on the control circuit board 800 directly carry these signals from the pins 910 to the micro-controller 802. Furthermore, snaps 908 are provided for securing the variable-speed switch assembly 110 over the control circuit board 800. This arrangement provides the several advantages in reducing wire ups, reducing the number of components, and increasing reliability of the device.

Figure 14A:
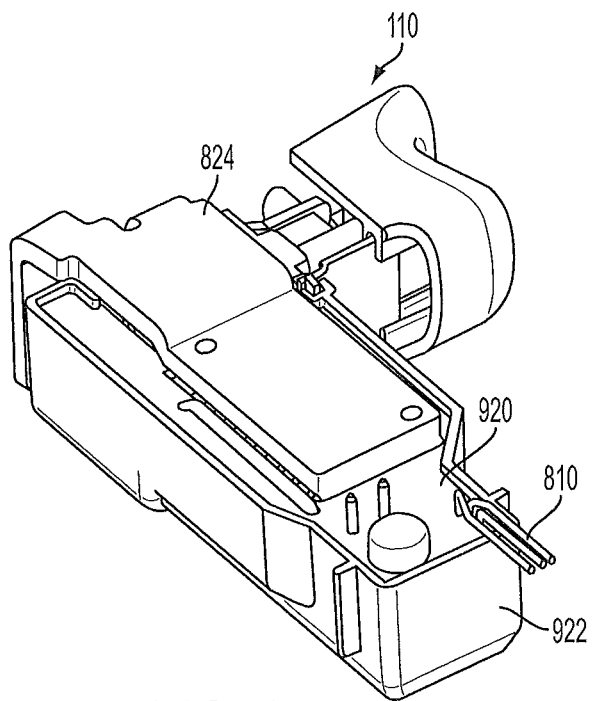
FIGS. 14A-14C depict views of a potting boat for potting the control module, according to an embodiment of the invention.
Figure 14B:
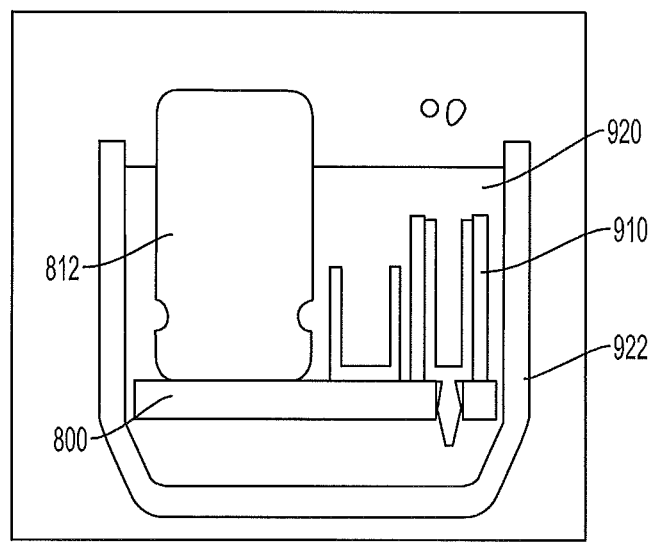
Figure 14C:
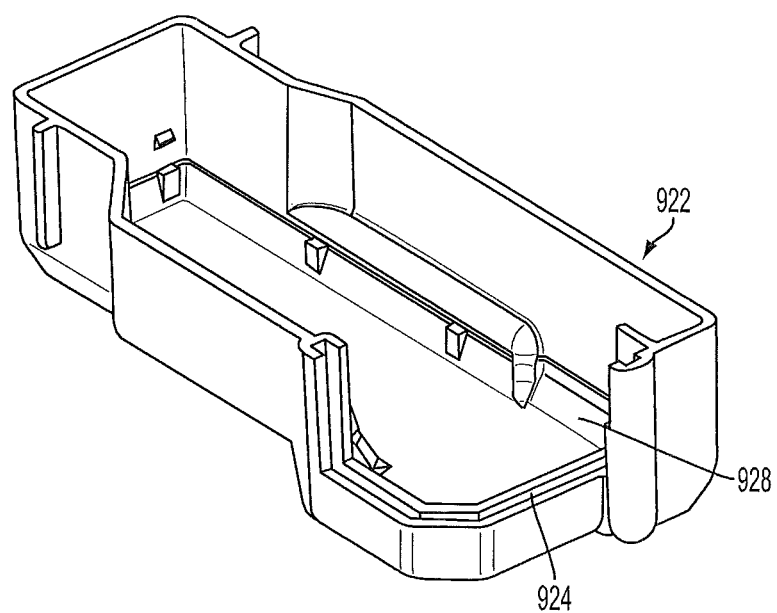

A further aspect of the invention is in connection with formation of a labyrinth 924 between a potting boat 922 and the input unit 110 to form a dam for the potting process, according to an exemplary embodiment with reference to FIGS. 14A-14C.

Power tools are subjected to a lot of vibrations. Designing control modules exposed to excessive vibrations is particularly challenging as control modules have a lot of solder joints which could break, crack, become intermittent, or even open when there is relative motion between the two components soldered. Failure of even a single solder joint might result in complete control module to become non functional.

In addition, power tools often operate in harsh environment which has fine dust, metal dust etc. Thus, power tools are subjected to a lot of contamination. Contamination could short two opposite polarity connections on the board and ultimately result in non-functional board.

In order to avoid damage to the control modules from vibration and contamination, the control modules are often potted. The potting compound is typically epoxy-based compound that is cured. When cured, the control module becomes a brick like structure capable to withstand vibration and contamination. FIG. 14A depicts a potted control unit including the potting boat 922 and potting compound 920 surrounding the control unit 106, according to an embodiment. The potting boat 922 may be made up plastic or similar material.

The potting process includes two steps: potting the bottom side of the control circuit board 800, placing the control unit 106 (including the control circuit board 800) inside the potting boat 922, and later potting the remainder of the potting boat 922. Alternatively, the potting boat 922 may be pre-filled with the potting compound 920 and then the control module 106 may be pushed into the potting boat 922. The boards 800, 820 may include holes for the pre-filled potting compound 920 to escape through as the control module 106 is lowered into the potting board 922. FIG. 14B shows the potting compound within the potting boat 922, according to an embodiment.

As described above, the input assembly 110 is mounted directly on the control circuit board 800. This requires a portion of the potting boat 922 to be cut out to accommodate the input unit 110. This arrangement complicates the potting process, as the potting compound 920 will simply leak out through the cut-out portion of the potting board. The cut-out portion 928 corresponding to the input unit 110 is depicted in FIG. 14C.

To prevent the potting compound 920 from pouring out of the potting boat 922 during the potting process, a labyrinth design including a tongue 926 (FIG. 13) on the input unit 110 and a groove 924 (FIG. 14C) on the potting boat 922 is employed to trap the potting compound 922. The groove 924 is provided at the cutout portion 928 of the potting boat 922. When the input unit 110 is mounted on the control unit 106, the tongue 926 and the groove 924 form a labyrinth, which traps the potting compound 920 inside the potting boat 922 and prevents it from pouring out of the potting boat 922. In addition, the labyrinth avoids forces from impact and vibration from being transferred directly to the input unit 110.

The description of the invention is merely exemplary in nature and, thus, variations that do not depart from the gist of the invention are intended to be within the scope of the invention. Such variations are not to be regarded as a departure from the scope of the invention.

The invention claimed is:

1. A power tool
comprising: a housing;
a brushless DC motor housed inside an upper body of the housing; and
a control unit housed inside a handle of the housing, the control unit comprising a micro-controller mounted on a control circuit board, a power unit electronically coupled to the micro-controller and mounted on a power circuit board arranged substantially parallel the control circuit board inside the handle, and a heat sink in thermal contact with the power unit.

2. The power tool of claim 1, further comprising an input unit a portion of which is integrally mounted on the control circuit board.

3. The power tool of claim 2, wherein the input unit comprises a main body attached to a forward/reverse switch and a variable-speed switch, the main body being mounted on a portion of the control circuit board.

4. The power tool of claim 3, wherein main body comprises a potentiometer coupled to the variable-speed switch.

5. The power tool of claim 3, wherein an outer wall of the main body comprises at least one snap for securing a connection of the input unit over the control circuit board and a plurality of pins for providing signals associated with on/off, variable-speed, and forward/reverse functionalities to the micro-controller.

6. The power tool of claim 2, wherein the control circuit board is greater in length than the power circuit board to accommodate the mounting of the input unit on the control circuit board adjacent the power circuit board.

7. The power tool of claim 6, wherein the control unit further comprises a bulk capacitor mounted on the control circuit board adjacent the power circuit board.

8. The power tool of claim 1, wherein the power unit comprises at least two through-holes for directly mounting the heat sink over the power unit.

9. The power tool of claim 2, wherein the control unit further comprises a potting boat containing the control circuit board and the power circuit board, the potting boat having a cut-out portion to facilitate mounting the input unit on the control circuit board.

10. The power tool of claim 9, wherein the cut out portion of the potting board includes a groove and the input unit includes a tongue fittingly corresponding to the groove to form a labyrinth.

11. A power tool comprising: a housing;
a brushless DC motor housed inside an upper body of the housing, the motor comprising a stator assembly and a rotor assembly partially arranged pivotably inside the stator assembly, the rotor assembly including a rotor lamination stack, a rotor fixedly housed inside a center portion of the lamination stack to pivot therewith, and a motor fan fixedly attached to the rotor and arranged adjacent the stator assembly; and
a control unit housed inside a handle of the housing, the control unit comprising a micro-controller, a power unit coupled to the micro-controller, and a heat sink in thermal contact with the power unit, wherein an upper portion of the heat sink extending towards the upper body of the housing comprises a tab protruding underneath the motor fan to transfer heat from the power unit to the airflow created by the motor fan.

12. The power tool of claim 11, wherein the tab comprises a plurality of grooves underneath the fan to increase the surface contact of the tab with the motor fan airflow.

13. The power tool of claim 11, wherein the heat sink further comprising a second tab protruding near at least one slot in the housing accommodating an input unit.

14. The power tool of claim 11, further comprising an input unit mounted on a control circuit board of the control unit, wherein the heat sink further comprises a protruded surface to bypass the input unit.

15. The power tool of claim 11, wherein the control unit comprising a control circuit board for mounting the micro-controller and a power circuit board for mounting the power unit, the power circuit board arranged substantially parallel the control circuit board inside the handle.

* * * * *